US008819072B1

(12) United States Patent (10) Patent No.: US 8,819,072 B1
Croicu et al. (45) Date of Patent: Aug. 26, 2014

(54) PROMOTING DATA FROM STRUCTURED DATA FILES

(75) Inventors: Alexandru Croicu, Kirkland, WA (US); Kamaljit S. Bath, Redmond, WA (US); Andrey Shur, Redmond, WA (US); Edward G. Essey, Seattle, WA (US); Nathaniel W. Stott, Redmond, WA (US); Jonathan D. Perlow, Seattle, WA (US); Shiraz J. Cupala, Seattle, WA (US); Brian G. O'Connor, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 925 days.

(21) Appl. No.: 10/770,240

(22) Filed: Feb. 2, 2004

(51) Int. Cl.
*G06F 17/30* (2006.01)
(52) U.S. Cl.
USPC .......................................... 707/796; 707/803
(58) Field of Classification Search
CPC ....................................................... G06F 17/30
USPC .......................................... 707/2, 8, 102, 200
See application file for complete search history.

(56) References Cited

U.S. PATENT DOCUMENTS

| 4,201,978 A | 5/1980 | Nally |
| 4,498,147 A | 2/1985 | Agnew et al. |
| 4,514,800 A | 4/1985 | Gruner et al. |
| 4,564,752 A | 1/1986 | Lepic et al. |
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,815,029 A | 3/1989 | Barker et al. |
| 4,847,749 A | 7/1989 | Collins et al. |
| 4,910,663 A | 3/1990 | Bailey |
| 4,926,476 A | 5/1990 | Covey |
| 4,933,880 A | 6/1990 | Borgendale et al. |
| 4,962,475 A | 10/1990 | Hernandez et al. |
| 5,025,484 A | 6/1991 | Yamanari et al. |
| 5,072,412 A | 12/1991 | Henderson, Jr. et al. |
| 5,140,563 A | 8/1992 | Thinesen |

(Continued)

FOREIGN PATENT DOCUMENTS

| EP | 0 841 615 A2 | 5/1998 |
| EP | 0 961 197 | 12/1999 |

(Continued)

OTHER PUBLICATIONS

Brogden, William, "Arbortext Adept 8 Editor Review," O'Reilly XML.Com, 'Online! Sep. 22, 1999) XP002230080, retrieved from the Internet <URL:http://www.xml.com/pub/a/1999/09/adept/AdeptRvw.htm>, retrieved on Feb. 5, 2003.

(Continued)

*Primary Examiner* — Son T Hoang
(74) *Attorney, Agent, or Firm* — Tom Wong; Jim Ross; Micky Minhas

(57) ABSTRACT

A system and method that enables promotion of data from within a structured data file to a library is described. This system and method can also enable demotion of data from a library to within a structured data file. Further, this system and method can copy data from a structured data file, perform a function on the copied data, and promote a result of the performed function to a library.

33 Claims, 11 Drawing Sheets

(56) References Cited

U.S. PATENT DOCUMENTS

| | | | |
|---|---|---|---|
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,220,649 A | 6/1993 | Forcier |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,251,273 A | 10/1993 | Betts et al. |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,517,665 A | 5/1996 | Sprague et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biege et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,742,795 A | 4/1998 | Kussel |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,794,246 A * | 8/1998 | Sankaran et al. ...... 707/999.003 |
| 5,798,757 A | 8/1998 | Smith |
| 5,801,701 A | 9/1998 | Koppolu et al. |
| 5,802,304 A | 9/1998 | Stone |
| 5,805,165 A | 9/1998 | Thorne et al. |
| 5,806,079 A | 9/1998 | Rivette et al. |
| 5,815,138 A | 9/1998 | Tsubaki et al. |
| 5,815,830 A | 9/1998 | Anthony |
| 5,826,031 A | 10/1998 | Nielsen |
| 5,826,265 A * | 10/1998 | Van Huben et al. ............... 707/8 |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,845,122 A | 12/1998 | Nielsen et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,873,088 A | 2/1999 | Hayashi et al. |
| 5,905,492 A | 5/1999 | Straub et al. |
| 5,907,621 A | 5/1999 | Bachman et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,919,247 A | 7/1999 | Van Hoff |
| 5,922,072 A | 7/1999 | Hutchinson et al. |
| 5,928,363 A | 7/1999 | Ruvolo |
| 5,929,858 A | 7/1999 | Shibata et al. |
| 5,940,075 A | 8/1999 | Mutschler, III et al. |
| 5,950,010 A | 9/1999 | Hesse et al. |
| 5,953,737 A | 9/1999 | Estakhri et al. |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni et al. |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,006,227 A | 12/1999 | Freeman et al. |
| 6,012,066 A | 1/2000 | Discount et al. |
| 6,014,135 A | 1/2000 | Fernandes |
| 6,016,520 A | 1/2000 | Facq et al. |
| 6,018,743 A | 1/2000 | Xu |
| 6,021,403 A | 2/2000 | Horvitz et al. |
| 6,026,379 A | 2/2000 | Haller et al. |
| 6,026,416 A | 2/2000 | Kanerva et al. |
| 6,031,989 A | 2/2000 | Cordell |

(56) References Cited

U.S. PATENT DOCUMENTS

| | | | |
|---|---|---|---|
| 6,035,297 A * | 3/2000 | Van Huben et al. ............. 707/8 |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,057,837 A | 5/2000 | Hatakeda et al. |
| 6,058,413 A | 5/2000 | Flores et al. |
| 6,065,043 A | 5/2000 | Domenikos et al. |
| 6,069,626 A | 5/2000 | Cline et al. |
| 6,070,184 A | 5/2000 | Blount et al. |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,679 A | 7/2000 | Barkley |
| 6,088,708 A | 7/2000 | Burch et al. |
| 6,091,417 A | 7/2000 | Lefkowitz |
| 6,094,657 A | 7/2000 | Hailpern et al. |
| 6,096,096 A | 8/2000 | Murphy et al. |
| 6,097,382 A | 8/2000 | Rosen et al. |
| 6,098,081 A | 8/2000 | Heidorn et al. |
| 6,105,012 A | 8/2000 | Chang et al. |
| 6,108,637 A | 8/2000 | Blumenau |
| 6,108,783 A | 8/2000 | Krawczyk et al. |
| 6,115,646 A | 9/2000 | Fiszman et al. |
| 6,121,965 A | 9/2000 | Kenney et al. |
| 6,122,647 A | 9/2000 | Horowitz et al. |
| 6,144,969 A | 11/2000 | Inokuchi et al. |
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,167,523 A | 12/2000 | Strong |
| 6,182,094 B1 | 1/2001 | Humpleman et al. |
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,423 B1 | 4/2001 | Davis |
| 6,219,698 B1 | 4/2001 | Iannucci et al. |
| 6,225,996 B1 | 5/2001 | Gibb et al. |
| 6,235,027 B1 | 5/2001 | Herzon |
| 6,243,088 B1 | 6/2001 | McCormack et al. |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,272,506 B1 | 8/2001 | Bell |
| 6,275,227 B1 | 8/2001 | DeStefano |
| 6,275,599 B1 | 8/2001 | Adler et al. |
| 6,279,042 B1 | 8/2001 | Ouchi |
| 6,281,896 B1 | 8/2001 | Alimpich et al. |
| 6,282,709 B1 | 8/2001 | Reha et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,292,941 B1 | 9/2001 | Jollands |
| 6,297,819 B1 | 10/2001 | Furst |
| 6,300,948 B1 | 10/2001 | Geller et al. |
| 6,307,955 B1 | 10/2001 | Zank et al. |
| 6,308,179 B1 | 10/2001 | Petersen et al. |
| 6,308,273 B1 | 10/2001 | Goertzel et al. |
| 6,311,221 B1 | 10/2001 | Raz et al. |
| 6,311,271 B1 | 10/2001 | Gennaro et al. |
| 6,314,415 B1 | 11/2001 | Mukherjee |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,336,214 B1 | 1/2002 | Sundaresan |
| 6,342,907 B1 | 1/2002 | Petty et al. |
| 6,343,149 B1 | 1/2002 | Motoiwa |
| 6,343,302 B1 | 1/2002 | Graham |
| 6,343,377 B1 | 1/2002 | Gessner et al. |
| 6,344,862 B1 | 2/2002 | Williams et al. |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,351,574 B1 | 2/2002 | Yair et al. |
| 6,353,851 B1 | 3/2002 | Anupam et al. |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,389,434 B1 | 5/2002 | Rivette et al. |
| 6,393,456 B1 | 5/2002 | Ambler et al. |
| 6,393,469 B1 | 5/2002 | Dozier et al. |
| 6,396,488 B1 | 5/2002 | Simmons et al. |
| 6,397,264 B1 | 5/2002 | Stasnick et al. |
| 6,405,221 B1 | 6/2002 | Levine et al. |
| 6,405,238 B1 | 6/2002 | Votipka |
| 6,408,311 B1 | 6/2002 | Baisley et al. |
| 6,414,700 B1 | 7/2002 | Kurtenbach et al. |
| 6,421,070 B1 | 7/2002 | Ramos et al. |
| 6,421,656 B1 | 7/2002 | Cheng et al. |
| 6,421,777 B1 | 7/2002 | Pierre-Loius |
| 6,425,125 B1 | 7/2002 | Fries et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,442,563 B1 | 8/2002 | Bacon et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu |
| 6,463,419 B1 | 10/2002 | Kluss |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,476,834 B1 | 11/2002 | Doval et al. |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,007 B1 | 12/2002 | Pang |
| 6,493,702 B1 | 12/2002 | Adar et al. |
| 6,501,864 B1 | 12/2002 | Eguchi et al. |
| 6,502,101 B1 | 12/2002 | Verprauskus et al. |
| 6,502,103 B1 | 12/2002 | Frey et al. |
| 6,505,200 B1 | 1/2003 | Ims et al. |
| 6,505,230 B1 | 1/2003 | Mohan et al. |
| 6,505,300 B2 | 1/2003 | Chan et al. |
| 6,507,856 B1 | 1/2003 | Chen et al. |
| 6,516,322 B1 | 2/2003 | Meredith |
| 6,519,617 B1 | 2/2003 | Wanderski et al. |
| 6,523,027 B1 | 2/2003 | Underwood |
| 6,529,909 B1 | 3/2003 | Bowman-Amuah |
| 6,535,229 B1 | 3/2003 | Kraft |
| 6,535,883 B1 | 3/2003 | Lee |
| RE38,070 E | 4/2003 | Spies et al. |
| 6,546,546 B1 | 4/2003 | Van Doorn |
| 6,546,554 B1 | 4/2003 | Schmidt et al. |
| 6,549,221 B1 | 4/2003 | Brown et al. |
| 6,549,878 B1 | 4/2003 | Lowry et al. |
| 6,549,922 B1 | 4/2003 | Srivastava et al. |

(56) References Cited

U.S. PATENT DOCUMENTS

| | | |
|---|---|---|
| 6,553,402 B1 | 4/2003 | Makarios et al. |
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,469 B1 | 6/2003 | Chiang et al. |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,594,686 B1 | 7/2003 | Edwards et al. |
| 6,598,219 B1 | 7/2003 | Lau |
| 6,603,489 B1 | 8/2003 | Edlund et al. |
| 6,604,099 B1 | 8/2003 | Chung et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastrianni et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,633,315 B1 | 10/2003 | Sobeski et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,661,920 B1 | 12/2003 | Skinner |
| 6,668,369 B1 | 12/2003 | Krebs et al. |
| 6,671,805 B1 | 12/2003 | Brown et al. |
| 6,675,202 B1 | 1/2004 | Perttunen |
| 6,678,625 B1 | 1/2004 | Reise et al. |
| 6,678,717 B1 | 1/2004 | Schneider |
| 6,681,370 B2 | 1/2004 | Lawrence et al. |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,728,755 B1 | 4/2004 | de Ment |
| 6,735,721 B1 | 5/2004 | Morrow et al. |
| 6,738,783 B2 | 5/2004 | Melli et al. |
| 6,745,367 B1 | 6/2004 | Bates et al. |
| 6,748,385 B1 | 6/2004 | Rodkin et al. |
| 6,748,569 B1 | 6/2004 | Brooke et al. |
| 6,751,777 B2 | 6/2004 | Bates et al. |
| 6,754,874 B1 | 6/2004 | Richman |
| 6,757,826 B1 | 6/2004 | Paltenghe |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,828,992 B1 | 12/2004 | Freeman et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,862,689 B2 | 3/2005 | Bergsten et al. |
| 6,871,220 B1 | 3/2005 | Rajan et al. |
| 6,871,345 B1 | 3/2005 | Crow et al. |
| 6,874,130 B1 | 3/2005 | Baweja et al. |
| 6,876,996 B2 * | 4/2005 | Czajkowski et al. ............. 707/2 |
| 6,883,168 B1 | 4/2005 | James et al. |
| 6,889,359 B1 | 5/2005 | Conner et al. |
| 6,901,403 B1 * | 5/2005 | Bata et al. ..................... 707/101 |
| 6,915,454 B1 | 7/2005 | Moore et al. |
| 6,925,609 B1 | 8/2005 | Lucke |
| 6,931,532 B1 | 8/2005 | Davis et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,129 B1 | 9/2005 | Loghmani |
| 6,948,133 B2 | 9/2005 | Haley |
| 6,948,135 B1 | 9/2005 | Ruthfield et al. |
| 6,950,980 B1 | 9/2005 | Malcolm |
| 6,950,987 B1 | 9/2005 | Hargraves et al. |
| 6,957,395 B1 | 10/2005 | Jobs et al. |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |
| 6,993,714 B2 | 1/2006 | Kaler et al. |
| 6,993,722 B1 | 1/2006 | Greer et al. |
| 6,996,776 B1 | 2/2006 | Makely et al. |
| 6,996,781 B1 | 2/2006 | Myers et al. |
| 7,000,179 B2 | 2/2006 | Yankovich et al. |
| 7,002,560 B2 | 2/2006 | Graham |
| 7,003,548 B1 | 2/2006 | Barck et al. |
| 7,003,722 B2 | 2/2006 | Rothchiller et al. |
| 7,010,580 B1 | 3/2006 | Fu et al. |
| 7,020,869 B2 | 3/2006 | Abriari et al. |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,043,687 B2 | 5/2006 | Knauss et al. |
| 7,051,273 B1 | 5/2006 | Holt et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,073,728 B2 | 7/2006 | Watson et al. |
| 7,080,083 B2 | 7/2006 | Kim et al. |
| 7,080,325 B2 | 7/2006 | Treibach-Heck et al. |
| 7,081,882 B2 | 7/2006 | Sowden et al. |
| 7,086,009 B2 | 8/2006 | Resnick et al. |
| 7,086,042 B2 | 8/2006 | Abe et al. |
| 7,088,374 B2 | 8/2006 | David et al. |
| 7,100,147 B2 | 8/2006 | Miller et al. |
| 7,103,611 B2 | 9/2006 | Murthy et al. |
| 7,106,888 B1 | 9/2006 | Silverbrook et al. |
| 7,107,282 B1 | 9/2006 | Yalmanchi |
| 7,107,521 B2 | 9/2006 | Santos |
| 7,107,539 B2 | 9/2006 | Abbott et al. |
| 7,120,863 B1 | 10/2006 | Wang |
| 7,124,167 B1 | 10/2006 | Bellotti et al. |
| 7,130,885 B2 | 10/2006 | Chandra et al. |
| 7,143,341 B1 | 11/2006 | Kohli |
| 7,146,564 B2 | 12/2006 | Kim et al. |
| 7,152,205 B2 | 12/2006 | Day et al. |
| 7,159,011 B1 | 1/2007 | Knight et al. |
| 7,168,035 B1 | 1/2007 | Bell et al. |
| 7,178,166 B1 | 2/2007 | Taylor et al. |
| 7,190,376 B1 | 3/2007 | Tonisson |
| 7,191,394 B1 | 3/2007 | Ardeleanu et al. |
| 7,200,665 B2 | 4/2007 | Eshghi et al. |
| 7,200,816 B2 | 4/2007 | Falk et al. |
| 7,213,200 B2 | 5/2007 | Abe et al. |
| 7,236,982 B2 | 6/2007 | Zlatanov et al. |

(56) References Cited

U.S. PATENT DOCUMENTS

| | | |
|---|---|---|
| 7,237,114 B1 | 6/2007 | Rosenberg |
| 7,249,328 B1 | 7/2007 | Davis |
| 7,251,777 B1 | 7/2007 | Valtchev et al. |
| 7,269,664 B2 | 9/2007 | Hutsch et al. |
| 7,272,789 B2 | 9/2007 | O'Brien |
| 7,281,018 B1 | 10/2007 | Begun et al. |
| 7,281,206 B2 | 10/2007 | Schnelle et al. |
| 7,281,245 B2 | 10/2007 | Reynar et al. |
| 7,284,208 B2 | 10/2007 | Matthews |
| 7,284,239 B1 * | 10/2007 | Young et al. .................. 717/137 |
| 7,287,218 B1 | 10/2007 | Knotz et al. |
| 7,296,017 B2 | 11/2007 | Larcheveque et al. |
| 7,305,613 B2 * | 12/2007 | Oezgen ........................ 715/234 |
| 7,313,758 B2 | 12/2007 | Kozlov |
| 7,316,003 B1 | 1/2008 | Dulepet et al. |
| 7,318,237 B2 | 1/2008 | Moriconi et al. |
| 7,334,187 B1 | 2/2008 | Stanciu et al. |
| 7,337,391 B2 | 2/2008 | Clarke et al. |
| 7,337,392 B2 | 2/2008 | Lue |
| 7,346,610 B2 | 3/2008 | Ruthfield et al. |
| 7,346,840 B1 | 3/2008 | Ravishankar et al. |
| 7,350,141 B2 | 3/2008 | Kotler et al. |
| 7,370,066 B1 | 5/2008 | Sikchi et al. |
| 7,373,595 B2 | 5/2008 | Jones et al. |
| 7,376,673 B1 | 5/2008 | Chalecki et al. |
| 7,412,679 B2 | 8/2008 | Shimura |
| 7,424,671 B2 | 9/2008 | Elza et al. |
| 7,428,699 B1 | 9/2008 | Kane et al. |
| 7,441,200 B2 | 10/2008 | Savage |
| 7,490,109 B1 | 2/2009 | Sikchi |
| 7,496,632 B2 | 2/2009 | Chapman et al. |
| 7,496,837 B1 | 2/2009 | Larcheveque et al. |
| 7,516,399 B2 | 4/2009 | Hsu et al. |
| 7,543,228 B2 | 6/2009 | Kelkar |
| 7,549,115 B2 | 6/2009 | Kotler |
| 7,562,215 B2 | 7/2009 | Cummins |
| 7,584,417 B2 | 9/2009 | Friend |
| 7,613,996 B2 | 11/2009 | Dallett et al. |
| 7,673,227 B2 | 3/2010 | Kotler |
| 7,673,228 B2 | 3/2010 | Keklar |
| 7,676,843 B1 | 3/2010 | Kelkar |
| 7,689,929 B2 | 3/2010 | Ruthfield |
| 7,692,636 B2 | 4/2010 | Kim |
| 7,712,022 B2 | 5/2010 | Smuga |
| 7,721,190 B2 | 5/2010 | Sikchi |
| 7,725,834 B2 | 5/2010 | Bell et al. |
| 7,743,063 B2 | 6/2010 | James et al. |
| 7,774,620 B1 | 8/2010 | Scott et al. |
| 7,904,801 B2 | 3/2011 | Catorcini |
| 7,937,651 B2 | 5/2011 | Kelkar |
| 8,487,879 B2 | 7/2013 | Kim et al. |
| 2001/0003828 A1 | 6/2001 | Peterson et al. |
| 2001/0007109 A1 | 7/2001 | Lange |
| 2001/0016880 A1 | 8/2001 | Cai et al. |
| 2001/0022592 A1 | 9/2001 | Alimpich et al. |
| 2001/0024195 A1 | 9/2001 | Hayakawa |
| 2001/0037345 A1 | 11/2001 | Kiernan et al. |
| 2001/0044850 A1 | 11/2001 | Raz et al. |
| 2001/0047372 A1 * | 11/2001 | Gorelik et al. ................. 707/514 |
| 2001/0051928 A1 | 12/2001 | Brody |
| 2001/0054004 A1 | 12/2001 | Powers |
| 2001/0056411 A1 | 12/2001 | Lindskog et al. |
| 2001/0056429 A1 | 12/2001 | Moore et al. |
| 2001/0056460 A1 | 12/2001 | Sahota et al. |
| 2002/0010700 A1 | 1/2002 | Wotring |
| 2002/0010743 A1 | 1/2002 | Ryan et al. |
| 2002/0010746 A1 | 1/2002 | Jilk et al. |
| 2002/0010855 A1 | 1/2002 | Reshef et al. |
| 2002/0013788 A1 | 1/2002 | Pennell et al. |
| 2002/0019941 A1 | 2/2002 | Chan et al. |
| 2002/0023111 A1 | 2/2002 | Arora et al. |
| 2002/0023113 A1 | 2/2002 | Hsing et al. |
| 2002/0026441 A1 | 2/2002 | Kutay et al. |
| 2002/0026461 A1 | 2/2002 | Kutay et al. |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0035581 A1 | 3/2002 | Reynar et al. |
| 2002/0040469 A1 | 4/2002 | Pramberger |
| 2002/0052769 A1 | 5/2002 | Navani et al. |
| 2002/0053021 A1 | 5/2002 | Rice et al. |
| 2002/0054126 A1 | 5/2002 | Gamon |
| 2002/0057297 A1 | 5/2002 | Grimes et al. |
| 2002/0059566 A1 * | 5/2002 | Delcambre et al. ........... 717/146 |
| 2002/0065798 A1 | 5/2002 | Bostleman et al. |
| 2002/0065847 A1 | 5/2002 | Furukawa et al. |
| 2002/0065950 A1 | 5/2002 | Katz et al. |
| 2002/0070973 A1 | 6/2002 | Croley |
| 2002/0078074 A1 | 6/2002 | Cho et al. |
| 2002/0078103 A1 | 6/2002 | Gorman et al. |
| 2002/0083145 A1 | 6/2002 | Perinpanathan |
| 2002/0083148 A1 | 6/2002 | Shaw et al. |
| 2002/0083318 A1 | 6/2002 | Larose |
| 2002/0091738 A1 | 7/2002 | Rohrabaugh et al. |
| 2002/0099952 A1 | 7/2002 | Lambert et al. |
| 2002/0100027 A1 | 7/2002 | Binding et al. |
| 2002/0103711 A1 | 8/2002 | Karas et al. |
| 2002/0107885 A1 | 8/2002 | Brooks et al. |
| 2002/0111699 A1 | 8/2002 | Melli et al. |
| 2002/0111932 A1 | 8/2002 | Roberge et al. |
| 2002/0112224 A1 | 8/2002 | Cox |
| 2002/0129056 A1 | 9/2002 | Conant |
| 2002/0133484 A1 * | 9/2002 | Chau et al. ......................... 707/3 |
| 2002/0143815 A1 * | 10/2002 | Sather .......................... 707/513 |
| 2002/0152222 A1 | 10/2002 | Holbrook |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156929 A1 | 10/2002 | Hekmatpour |
| 2002/0169752 A1 | 11/2002 | Kusama et al. |
| 2002/0169789 A1 | 11/2002 | Kutay et al. |
| 2002/0174147 A1 | 11/2002 | Wang et al. |
| 2002/0174417 A1 * | 11/2002 | Sijacic et al. .................. 717/147 |
| 2002/0178187 A1 | 11/2002 | Rasmussen et al. |
| 2002/0178380 A1 | 11/2002 | Wolf et al. |
| 2002/0184188 A1 | 12/2002 | Mandyam et al. |
| 2002/0184219 A1 | 12/2002 | Preisig et al. |
| 2002/0184401 A1 | 12/2002 | Kadel, Jr. et al. |
| 2002/0184485 A1 | 12/2002 | Dray et al. |
| 2002/0188597 A1 | 12/2002 | Kern et al. |
| 2002/0188613 A1 | 12/2002 | Chakraborty et al. |
| 2002/0194219 A1 | 12/2002 | Bradley et al. |
| 2002/0194388 A1 | 12/2002 | Boloker et al. |
| 2002/0196281 A1 | 12/2002 | Audleman et al. |
| 2002/0196288 A1 | 12/2002 | Emrani |
| 2002/0198891 A1 | 12/2002 | Li et al. |
| 2002/0198935 A1 | 12/2002 | Crandall, Sr. et al. |
| 2003/0004951 A1 | 1/2003 | Chokshi |
| 2003/0007000 A1 | 1/2003 | Carlson et al. |
| 2003/0014397 A1 | 1/2003 | Chau et al. |
| 2003/0018668 A1 | 1/2003 | Britton et al. |
| 2003/0020746 A1 | 1/2003 | Chen et al. |
| 2003/0023641 A1 | 1/2003 | Gorman et al. |
| 2003/0023953 A1 | 1/2003 | Lucassen et al. |
| 2003/0025693 A1 | 2/2003 | Haley |
| 2003/0025732 A1 | 2/2003 | Prichard |
| 2003/0026507 A1 | 2/2003 | Zlotnick |
| 2003/0028550 A1 | 2/2003 | Lee et al. |
| 2003/0037303 A1 | 2/2003 | Bodlaender et al. |
| 2003/0038788 A1 | 2/2003 | Demartines et al. |
| 2003/0038846 A1 | 2/2003 | Hori et al. |
| 2003/0043986 A1 | 3/2003 | Creamer et al. |
| 2003/0046665 A1 | 3/2003 | Ilin |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0055828 A1 | 3/2003 | Koch et al. |
| 2003/0056198 A1 | 3/2003 | Al-Azzawe et al. |
| 2003/0061386 A1 | 3/2003 | Brown |
| 2003/0061567 A1 | 3/2003 | Brown |
| 2003/0069881 A1 | 4/2003 | Huttunen |
| 2003/0084424 A1 * | 5/2003 | Reddy et al. .................. 717/105 |

(56) References Cited

U.S. PATENT DOCUMENTS

| | | |
|---|---|---|
| 2003/0093755 A1 | 5/2003 | O'Carroll |
| 2003/0101414 A1 | 5/2003 | Liu et al. |
| 2003/0110443 A1 | 6/2003 | Yankovich et al. |
| 2003/0120578 A1 | 6/2003 | Newman |
| 2003/0120651 A1 | 6/2003 | Bernstein et al. |
| 2003/0120659 A1 | 6/2003 | Sridhar |
| 2003/0120671 A1 | 6/2003 | Kim et al. |
| 2003/0120686 A1 | 6/2003 | Kim et al. |
| 2003/0126555 A1 | 7/2003 | Aggarwal et al. |
| 2003/0128196 A1 | 7/2003 | Lapstun et al. |
| 2003/0135825 A1 | 7/2003 | Gertner et al. |
| 2003/0140132 A1 | 7/2003 | Champagne et al. |
| 2003/0140160 A1 | 7/2003 | Raz et al. |
| 2003/0142072 A1 | 7/2003 | Lapstun et al. |
| 2003/0149934 A1 | 8/2003 | Worden |
| 2003/0158897 A1 | 8/2003 | Ben-Natan et al. |
| 2003/0163285 A1 | 8/2003 | Nakamura et al. |
| 2003/0167277 A1* | 9/2003 | Hejlsberg et al. ...... 707/999.102 |
| 2003/0172113 A1 | 9/2003 | Cameron et al. |
| 2003/0182268 A1 | 9/2003 | Lal |
| 2003/0182327 A1 | 9/2003 | Ramanujam et al. |
| 2003/0187756 A1 | 10/2003 | Klivington et al. |
| 2003/0187930 A1 | 10/2003 | Ghaffar et al. |
| 2003/0188260 A1 | 10/2003 | Jensen et al. |
| 2003/0189593 A1 | 10/2003 | Yarvin |
| 2003/0192008 A1 | 10/2003 | Lee |
| 2003/0200506 A1 | 10/2003 | Abe et al. |
| 2003/0204481 A1 | 10/2003 | Lau |
| 2003/0204511 A1 | 10/2003 | Brundage |
| 2003/0204814 A1 | 10/2003 | Elo et al. |
| 2003/0205615 A1 | 11/2003 | Marappan |
| 2003/0210428 A1 | 11/2003 | Bevlin et al. |
| 2003/0212664 A1 | 11/2003 | Breining et al. |
| 2003/0212902 A1 | 11/2003 | van der Made |
| 2003/0217053 A1 | 11/2003 | Bachman et al. |
| 2003/0220930 A1 | 11/2003 | Milleker et al. |
| 2003/0225469 A1 | 12/2003 | DeRemer et al. |
| 2003/0225768 A1 | 12/2003 | Chaudhuri |
| 2003/0225829 A1 | 12/2003 | Pena et al. |
| 2003/0226132 A1 | 12/2003 | Tondreau et al. |
| 2003/0233374 A1 | 12/2003 | Spinola et al. |
| 2003/0233644 A1 | 12/2003 | Cohen et al. |
| 2003/0236859 A1 | 12/2003 | Vaschillo et al. |
| 2003/0236903 A1 | 12/2003 | Piotrowski |
| 2003/0237046 A1 | 12/2003 | Parker et al. |
| 2003/0237047 A1 | 12/2003 | Borson |
| 2004/0002939 A1 | 1/2004 | Arora |
| 2004/0002950 A1 | 1/2004 | Brennan et al. |
| 2004/0003031 A1 | 1/2004 | Brown et al. |
| 2004/0003353 A1 | 1/2004 | Rivera et al. |
| 2004/0003389 A1 | 1/2004 | Reynar et al. |
| 2004/0006744 A1 | 1/2004 | Jones et al. |
| 2004/0010752 A1 | 1/2004 | Chan et al. |
| 2004/0015778 A1 | 1/2004 | Britton et al. |
| 2004/0015783 A1 | 1/2004 | Lennon et al. |
| 2004/0024842 A1 | 2/2004 | Witt |
| 2004/0030991 A1 | 2/2004 | Hepworth et al. |
| 2004/0039881 A1 | 2/2004 | Shoebridge et al. |
| 2004/0039990 A1 | 2/2004 | Bakar et al. |
| 2004/0039993 A1 | 2/2004 | Kougiouris et al. |
| 2004/0044961 A1 | 3/2004 | Pesenson |
| 2004/0044965 A1 | 3/2004 | Toyama et al. |
| 2004/0046789 A1 | 3/2004 | Inanoria |
| 2004/0054966 A1 | 3/2004 | Busch et al. |
| 2004/0059754 A1 | 3/2004 | Barghout et al. |
| 2004/0060006 A1* | 3/2004 | Lindblad et al. ............ 715/513 |
| 2004/0073565 A1 | 4/2004 | Kaufman et al. |
| 2004/0073868 A1 | 4/2004 | Easter et al. |
| 2004/0078756 A1 | 4/2004 | Napper et al. |
| 2004/0083426 A1 | 4/2004 | Sahu |
| 2004/0088320 A1* | 5/2004 | Perry ........................ 707/103 R |
| 2004/0088647 A1 | 5/2004 | Miller et al. |
| 2004/0088652 A1* | 5/2004 | Abe et al. ................... 715/513 |
| 2004/0093596 A1 | 5/2004 | Koyano |
| 2004/0107367 A1 | 6/2004 | Kisters |
| 2004/0117769 A1 | 6/2004 | Lauzon et al. |
| 2004/0123277 A1 | 6/2004 | Schrader et al. |
| 2004/0128296 A1 | 7/2004 | Krishnamurthy et al. |
| 2004/0139400 A1 | 7/2004 | Allam et al. |
| 2004/0146199 A1 | 7/2004 | Berkner et al. |
| 2004/0148178 A1 | 7/2004 | Brain |
| 2004/0148514 A1 | 7/2004 | Fee et al. |
| 2004/0148571 A1 | 7/2004 | Lue |
| 2004/0162741 A1 | 8/2004 | Flaxer et al. |
| 2004/0163041 A1 | 8/2004 | Engel |
| 2004/0163046 A1 | 8/2004 | Chu et al. |
| 2004/0172442 A1 | 9/2004 | Ripley |
| 2004/0181543 A1 | 9/2004 | Wu et al. |
| 2004/0181711 A1 | 9/2004 | Johnson et al. |
| 2004/0186762 A1 | 9/2004 | Beaven et al. |
| 2004/0189708 A1 | 9/2004 | Larcheveque et al. |
| 2004/0189716 A1 | 9/2004 | Paoli et al. |
| 2004/0194035 A1 | 9/2004 | Chakraborty |
| 2004/0196266 A1 | 10/2004 | Matsuura et al. |
| 2004/0199572 A1 | 10/2004 | Hunt et al. |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler |
| 2004/0205592 A1 | 10/2004 | Huang |
| 2004/0205605 A1 | 10/2004 | Adler et al. |
| 2004/0205644 A1 | 10/2004 | Shaughnessy et al. |
| 2004/0205653 A1 | 10/2004 | Hadfield et al. |
| 2004/0205671 A1 | 10/2004 | Sukehiro et al. |
| 2004/0210599 A1 | 10/2004 | Friedman et al. |
| 2004/0210645 A1 | 10/2004 | Kouznetsov et al. |
| 2004/0212586 A1 | 10/2004 | Denny |
| 2004/0216084 A1 | 10/2004 | Brown et al. |
| 2004/0220912 A1* | 11/2004 | Manikutty et al. ................ 707/3 |
| 2004/0221238 A1 | 11/2004 | Cifra et al. |
| 2004/0221245 A1 | 11/2004 | Chickles et al. |
| 2004/0237030 A1 | 11/2004 | Malkin |
| 2004/0260593 A1 | 12/2004 | Abraham-Fuchs et al. |
| 2004/0261019 A1 | 12/2004 | Imamura et al. |
| 2004/0268229 A1 | 12/2004 | Paoli et al. |
| 2005/0004893 A1 | 1/2005 | Sangroniz |
| 2005/0005248 A1 | 1/2005 | Rockey et al. |
| 2005/0015279 A1 | 1/2005 | Rucker |
| 2005/0015732 A1 | 1/2005 | Vedula et al. |
| 2005/0022115 A1 | 1/2005 | Baumgartner et al. |
| 2005/0027757 A1 | 2/2005 | Kiessig et al. |
| 2005/0028073 A1 | 2/2005 | Henry et al. |
| 2005/0033626 A1 | 2/2005 | Kruse et al. |
| 2005/0033728 A1 | 2/2005 | James |
| 2005/0038711 A1 | 2/2005 | Marlelo |
| 2005/0050066 A1 | 3/2005 | Hughes |
| 2005/0055627 A1 | 3/2005 | Lloyd et al. |
| 2005/0060324 A1 | 3/2005 | Johnson et al. |
| 2005/0060647 A1 | 3/2005 | Doan et al. |
| 2005/0060721 A1 | 3/2005 | Choudhary et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0076022 A1 | 4/2005 | Wu et al. |
| 2005/0076049 A1 | 4/2005 | Qubti et al. |
| 2005/0080801 A1 | 4/2005 | Kothandaram et al. |
| 2005/0091285 A1* | 4/2005 | Krishnan et al. .............. 707/200 |
| 2005/0091305 A1 | 4/2005 | Lange et al. |
| 2005/0097536 A1 | 5/2005 | Bernstein et al. |
| 2005/0102370 A1 | 5/2005 | Lin et al. |
| 2005/0102612 A1 | 5/2005 | Allan et al. |
| 2005/0108104 A1 | 5/2005 | Woo |
| 2005/0108624 A1 | 5/2005 | Carrier |
| 2005/0114757 A1 | 5/2005 | Sahota et al. |
| 2005/0114764 A1 | 5/2005 | Gudenkauf et al. |
| 2005/0132043 A1 | 6/2005 | Wang et al. |
| 2005/0132196 A1 | 6/2005 | Dietl |
| 2005/0138031 A1 | 6/2005 | Wefers |
| 2005/0138086 A1 | 6/2005 | Pecht-Seibert |
| 2005/0138539 A1 | 6/2005 | Bravery et al. |
| 2005/0149375 A1 | 7/2005 | Wefers |
| 2005/0149726 A1 | 7/2005 | Joshi et al. |
| 2005/0159136 A1 | 7/2005 | Rouse et al. |

(56) References Cited

U.S. PATENT DOCUMENTS

| | | |
|---|---|---|
| 2005/0160398 A1 | 7/2005 | Bjornson et al. |
| 2005/0171746 A1 | 8/2005 | Thalhammer-Reyero |
| 2005/0198086 A1 | 9/2005 | Moore |
| 2005/0198125 A1 | 9/2005 | Macleod et al. |
| 2005/0198247 A1 | 9/2005 | Perry et al. |
| 2005/0210263 A1 | 9/2005 | Levas et al. |
| 2005/0219226 A1 | 10/2005 | Liu et al. |
| 2005/0223063 A1 | 10/2005 | Chang et al. |
| 2005/0223320 A1 | 10/2005 | Brintzenhofe et al. |
| 2005/0234890 A1 | 10/2005 | Enzler et al. |
| 2005/0246304 A1 | 11/2005 | Knight et al. |
| 2005/0257148 A1 | 11/2005 | Goodman et al. |
| 2005/0262112 A1 | 11/2005 | Moore |
| 2005/0268217 A1 | 12/2005 | Garrison |
| 2005/0268222 A1 | 12/2005 | Cheng |
| 2006/0010386 A1 | 1/2006 | Khan |
| 2006/0020586 A1 | 1/2006 | Prompt et al. |
| 2006/0026500 A1 | 2/2006 | Qa 'Im-maqami |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0059107 A1 | 3/2006 | Elmore et al. |
| 2006/0059434 A1 | 3/2006 | Boss et al. |
| 2006/0069605 A1 | 3/2006 | Hatoun |
| 2006/0069985 A1 | 3/2006 | Friedman et al. |
| 2006/0074933 A1 | 4/2006 | Barac et al. |
| 2006/0074969 A1 | 4/2006 | Barac et al. |
| 2006/0075245 A1 | 4/2006 | Meier |
| 2006/0080657 A1 | 4/2006 | Goodman |
| 2006/0085409 A1 | 4/2006 | Rys et al. |
| 2006/0101037 A1 | 5/2006 | Brill et al. |
| 2006/0101051 A1 | 5/2006 | Carr et al. |
| 2006/0107197 A1 | 5/2006 | Friend et al. |
| 2006/0107206 A1 | 5/2006 | Koskimies |
| 2006/0107224 A1 | 5/2006 | Friend et al. |
| 2006/0129583 A1 | 6/2006 | Catorcini et al. |
| 2006/0129978 A1 | 6/2006 | Abriari et al. |
| 2006/0136422 A1 | 6/2006 | Malveief et al. |
| 2006/0143220 A1 | 6/2006 | Spencer |
| 2006/0155857 A1 | 7/2006 | Feenan et al. |
| 2006/0161559 A1 | 7/2006 | Bordawekar et al. |
| 2006/0161837 A1 | 7/2006 | Kelkar et al. |
| 2006/0173865 A1 | 8/2006 | Fong |
| 2006/0184393 A1 | 8/2006 | Ewin et al. |
| 2006/0195413 A1 | 8/2006 | Davis et al. |
| 2006/0200754 A1 | 9/2006 | Kablesh et al. |
| 2006/0248468 A1 | 11/2006 | Constantine et al. |
| 2007/0005611 A1 | 1/2007 | Takasugi et al. |
| 2007/0036433 A1 | 2/2007 | Teutsch et al. |
| 2007/0050719 A1 | 3/2007 | Lui et al. |
| 2007/0061467 A1 | 3/2007 | Essey et al. |
| 2007/0061706 A1 | 3/2007 | Cupala et al. |
| 2007/0074106 A1 | 3/2007 | Ardeleanu et al. |
| 2007/0088554 A1 | 4/2007 | Harb et al. |
| 2007/0094589 A1 | 4/2007 | Paoli |
| 2007/0100877 A1 | 5/2007 | Paoli |
| 2007/0101280 A1 | 5/2007 | Paoli |
| 2007/0118538 A1 | 5/2007 | Ahern et al. |
| 2007/0118803 A1 | 5/2007 | Walker et al. |
| 2007/0130500 A1 | 6/2007 | Rivers-Moore et al. |
| 2007/0130504 A1 | 6/2007 | Betancourt et al. |
| 2007/0186157 A1 | 8/2007 | Walker et al. |
| 2007/0208606 A1 | 9/2007 | MacKay et al. |
| 2007/0208769 A1 | 9/2007 | Boehm et al. |
| 2007/0276768 A1 | 11/2007 | Pallante |
| 2008/0021916 A1 | 1/2008 | Schnelle et al. |
| 2008/0027896 A1 | 1/2008 | Anjur |
| 2008/0028340 A1 | 1/2008 | Davis |
| 2008/0052287 A1 | 2/2008 | Stanciu |
| 2008/0126402 A1 | 5/2008 | Sitchi et al. |
| 2008/0134162 A1 | 6/2008 | James |
| 2009/0070411 A1 | 3/2009 | Chang et al. |
| 2009/0119580 A1 | 5/2009 | Rohrabaugh et al. |
| 2009/0138389 A1 | 5/2009 | Barthel |
| 2009/0177961 A1 | 7/2009 | Fortini |
| 2010/0125778 A1 | 5/2010 | Kelkar |
| 2013/0271409 A1 | 10/2013 | Kim et al. |
| 2013/0275865 A1 | 10/2013 | Kim et al. |

FOREIGN PATENT DOCUMENTS

| | | |
|---|---|---|
| EP | 1 076 290 A2 | 2/2001 |
| EP | 1221661 | 7/2002 |
| JP | 63085960 | 4/1988 |
| JP | 401173140 | 7/1989 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 10-171662 | 6/1998 |
| JP | 10-207805 | 8/1998 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 A1 | 6/2001 |
| WO | WO 01/57720 | 8/2001 |

OTHER PUBLICATIONS

Alschuler, Liora, "A tour of XMetal" O'Reilly XML.com, 'Online! Jul. 14, 1999, XP002230081, retrieved from the Internet: <URL:http//www.xml.com/pub/a/SeyboldReport/ip031102.html>, retrieved on Feb. 5, 2003.

Davidow, Ari, "XML Editors: Allegations of Functionality in search of reality," Internet, 'Online! 1999, XP002230082, retrieved from the Internet, <URL:http://www.ivritype.com/xml/>.

Battle, Steven A. et al., "Flexible Information Presentation with XML", 1998, The Institution of Electrical Engineers, 6 pages.

Ciancarini, Paolo et al., "Managing Complex Documents Over the WWW: A Case Study for XML", IEEE Transactions on Knowledge and Data Engineering, vol. 11, No. 4, Jul./Aug. 1999, pp. 629-638.

Kanemoto, Hirotaka et al., "An Efficiently Updatable Index Scheme for Structured Documents", 1998 IEEE, pp. 991-996.

Usdin, Tommie et al., "XML: Not a Silver Bullet, But a Great Pipe Wrench", Standardview vol. 6, No. 3, Sep. 1998, pp. 125-132.

Sutanthavibul, Supoj et al., "XFIG Version 3.2 Patchlevel 2(Jul. 2, 1998) Users Manual (Edition 1.0)", Internet Document, [Online] Jul. 2, 1998, XP002229137 Retrieved from the Internet: <URL:http://www.ice.mtu.edu/online_docs/xfig332/> [retrieved on Jan. 28, 2003].

"Architecture for a Dynamic Information Area Control", IBM Technical Disclosure Bulletin, IBM Corp. New York, US, vol. 37, No. 10, Jan. 10, 1994, pp. 245-246.

Au, Irene et al., "Netscape Communicator's Collapsible Toolbars," CHI '98, Human Factors in Computing Systems, Conference Proceedings, Los Angeles, CA, Apr. 18-23, 1998, pp. 81-86.

Netscape Communication Corporation: "Netscape Communicator 4.61 for OS/2 Warp" Software, 1999, The whole software release & "Netscape—Version 4.61 [en]—010615" Netscape Screenshot, Oct. 2, 2002.

Hall, Richard Scott, "Agent-based Software Configuration and Deployment," Thesis of the University of Colorado, Online, Dec. 31, 1999, retrieved from the Internet on Nov. 7, 2003: <http://www.cs.colorado.edu/users/rickhall/documents/ThesisFinal.pdf>, 169 pages.

Van Hoff, Arthur et al., "The Open Software Description Format," Online, Aug. 13, 1997, retrieved from the Internet on Nov. 7, 2003: <http://www.w3.org/TR/NOTE-OSD>, 11 pages.

Netscape Communications Corp., "SmartUpdate Developer's Guide," Online, Mar. 11, 1999, retrieved from the Internet on Dec. 8, 2000: <http://developer.netscape.com:80/docs/manuals/communicator/jarman/index.htm>, 83 pages.

Dayton, Linnea and Jack Davis, "Photo Shop 5/5.5 WOW! Book," 2000, Peachpit Press, pp. 8-17.

(56) References Cited

OTHER PUBLICATIONS

Williams, Sara and Charlie Kindel, "The Component Object Model: A Technical Overview," Oct. 1994, Microsoft Corp., pp. 1-14.
Varlamis, Iraklis et al., "Bridging XML-Schema and relational databases. A system for generating and manipulating relational databases using valid XML documents," DocEng '01, Nov. 9-10, 2001, Copyright 2001, ACM 1-58113-432-0/01/0011, pp. 105-114.
Hardy, Matthew R. B. et al., "Mapping and Displaying Structural Transformations between XML and PDF," DocEng '02, Nov. 8-9, 2002, Copyright 2002, ACM 1-58113-594-7/02/0011, pp. 95-102.
Kim, Sang-Kyun et al., "Immediate and Partial Validation Mechanism for the Conflict Resolution of Update Operations in XML Databases," WAIM 2002, LNCS 2419, 2002, pp. 387-396, Springer-Verlag Berlin Heidelberg 2002.
Chuang, Tyng-Ruey, "Generic Validation of Structural Content with Parametric Modules," ICFP '01, Sep. 3-5, 2001, Copyright 2001, ACM 1-58113-415-0/01/0009, pp. 98-109.
Chen, Ya Bing et al., "Designing Valid XML Views," ER 2002, LNCS 2503, 2002, Springer-Verlag Berlin Heidelberg 2002, pp. 463-477.
Chen, Yi et al., "XKvalidator: A Constraint Validator for XML," CIKM '02, Nov. 4-9, 2002, Copyright ACM 1-58113-492-4/02/0011, pp. 446-452.
Rogge, Boris et al.. "Validating MPEG-21 Encapsulated Functional Metadata," IEEE 2002, pp. 209-212.
Nelson, Mark, "Validation with MSXML and XML Schema," Windows Developer Magazine, Jan. 2002. pages 35-38.
Chien, Shu-Yao et al., "XML Document Versioning," SIGMOD Record, vol. 30, No. 3, Sep. 2001, pp. 46-53.
Wong, Raymond K. et al., "Managing and Querying Multi-Version XML Data with Update Logging," DocEng '02, Nov. 8-9, 2002, Copyright 2002, ACM 1-58113-594-7/02/0011, pp. 74-81.
Chien, Shu-Yao et al., "Efficient schemes for managing multiversionXML documents", VLDB Journal (2002), pp. 332-353.
Chien, Shu-Yao et al., "Efficient Management of Multiversion Documents by Object Referencing," Proceedings of the 27th VLDB Conference, 2001, pp. 291-300.
Chien, Shu-Yao et al., "Storing and Querying Multiversion XML Documents using Durable Node Numbers," IEEE 2002, pp. 232-241.
Dyck, Timothy, "XML Spy Tops as XML Editor," http://www.eweek.com/articie2/0,3959,724041,00.asp, Nov. 25, 2002, 4 pages.
"Netscape window" Netscape Screenshot, Oct. 2, 2002.
Haukeland, Jan-Henrick, "Tsbiff—tildeslash biff—version 1.2.1" Internet Document, [Online] Jun. 1999, URL:http://web.archive.org/web/19990912001527/http://www.tildeslash.com/tsbiff/.
U.S. Appl. No. 60/209,713, filed Jun. 5, 2000.
James Clark, Editor; "XSL Transformation (XSLT) Version 1.0", Nov. 16, 1999, W3C (MIT, INRIA, Keio), pp. 1-156.
James Clark and Steve Derose, "XML Path Language (XPath) Version 1.0", Nov. 16, 1999, W3C (MIT, INRIA, Keio), pp. 1-49.
Musgrave, S., "Networking technology—impact and opportunities", Survey and Statistical Computing 1996. Proceedings of the Second ASC International Conference. Sep. 1996. pp. 369-378. London, UK.
Rapaport, L., "Get more from SharePoint", Transform Magazine, vol. 11, No. 3, Mar. 2002, pp. 13, 15.
McCright, J.S., "New Tool Kit to Link Groove with Microsoft SharePoint", eWeek, Enterprise News & Reviews, Ziff Davis Media Inc., Jul. 29, 2002, 1 page.
Noore A.; "A secure conditional access system using digital signature and encryption" 2003 Digest of Technical Papers. International Conference on Consumer Electronics Jun. 2003 pp. 220-221.
Komatsu, N., et al., "A Proposal on Digital Watermark in Document Image Communication and Its Application to Realizing a Signature," Electronics and Communications in Japan, Part I: Communications, vol. 73, No. 5, May 1990, pp. 22-33.
Sun Q. et al.; "A robust and secure media signature scheme for JPEG images" Proceedings of 2002 IEEE Workshop on Multimedia Signal Processing Dec. 2002 pp. 296-299.
Description of Whitehill Composer software product, produced by Whitehill Technologies, Inc., available at <http://www.xml.com/pub/p/221>, accessed on Apr. 8, 2004, two pages.
Pacheco, X., et al., "Delphi 5 Developer's Guide," Sams Publishing 1999, Chapter 31, Section: Data Streaming, 6 pages.
Clarke, P., "From small beginnings," Knowledge Management, Nov. 2001, pp. 28-30.
Hwang, et al; "Micro-Firewalls for Dynamic Network Security with Distributed Intrusion Detection"; IEEE International Symposium on Network Computing and Applications; 2001; pp. 68-79.
Schmid, et al; "Protecting Data from Malicious Software"; 18th Annual Computer Security Applications Conference; 2002; pp. 199-208.
Kaiya, et al; "Specifying Runtime Environments and Functionalities of Downloadable Components Under the Sandbox Model"; International Symposium on Principles of Softwre Evolution; 2000; pp. 138-142.
Prevelakis, et al; "Sandboxing Applications"; Proceedings of the FREENIX Track; 2001; pp. 119-126.
Tomimori, et al; "An Efficient and Flexible Access Control Framework for Java Programs in Mobile Terminals"; 22nd International Conference on Distributed Computing Systems Workshops; 2002; pp. 777-782.
U.S. Appl. No. 60/191,662, Kutay et al.
U.S. Appl. No. 60/203,081, Ben-Natan et al.
Clapp D., "The NeXT Application Kit Part I: Non-Responsive Classes," The NeXT Bible 1990, Chapter 16, pp. 275-293.
Staneck W., "Internal and External Media" Electronic Publishing Unleashed, 1995, Chapter 22, pp. 510-542.
Zdonik S., "Object Management System Concepts," ACM, 1984, pp. 13-19.
Trupin J., "The Visual Programmer," Microsoft Systems Journal, Apr. 1996, pp. 103-105.
OMG XML Metadata Interchange (XMI) Specification Version 1.2 Jan. 2002.
IBM: Stack Algorithm for Extractin Subtree from Serialized Tree, Mar. 1, 1994, TDB-ACC-NONN94033, 3 pages.
Laura Acklen & Read Gilgen, "Using Corel Wordperfect 9", 251-284, 424-434, 583-586 (1998).
Bruce Halberg et al, "Using Microsoft Excel.97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.
LeBlond et al, "PC Magazine Guide to Quattro Pro for Windows", pp. 9-11, 42-61, Ziff-Davis Press, Copyright 1993 by the LeBlond Group.
Mansfield, "Excel 97 for Busy People", Published by Osborne/Mcgraw-Hill 1997 pp. 46-50.
"Microsoft Visual Basic 5.0 Programmer's Guide 1997"; pp. 578-579; Redmond WA 98052-6399.
Han et al., WebSplitter: A Unified XML Framework for Multi-Device Collaborative Web Browsing, 2000, ACM Conference on Cimputer Supported Cooperative Work, 10 pages.
Atova, "User Reference manual Version 4.4, XML Spy suite 4.4," Atova Ges.m.b.H and Altova, Inc., May 24, 2002, pages cover, copyright page, 1-565.
Altova et al. XML Spy, XML integrated Developinent Environments, Altova Inc., 2002, pp. 1-18.
Ben-Natan, U.S. Appl. No. 60/203,081, filed May 9, 2000, entitled "Internet platform for creating and supporting communities".
Ixia Soft, "Steamlining content creation, retrieval, and publishing on the Web using TEXTML Server and SML Spy 4 Suite in an integrated, Web publishing environment," (Partners's Whitepaper, published on the Web as of Jun. 6, 2002, downlowad pp. 1-16.
Kutay, U.S. Appl. No. 60/209,713, filed Jun. 5, 2000, entitled, "Methods and systems for accessing, organizing presenting and viewing data".
Microsoft Word 2000 (see Screen Shot "About Microsoft Word") Published 1983-1999 and Microsoft Excel 2000 (see Screen Shot "About Microsoft Excel") Published 1988-1999, Three pages.
Moore, U.S. Appl. No. 60/191,662, filed Mar. 23, 2000, entitled "Collection-based presistent digital archives".
Altova, Inc., "XML Spy 4.0 Manual," Altova Inc. & Altova GmbH, coyright 1998-2001, Chapters 1, 2, and 6, encompassing pp. 1-17, 18-90, and 343-362.

(56) References Cited

OTHER PUBLICATIONS

Cybook, Inc.: "Copying the Search Form to Services-based Web Sites" INternet Article, (online) Jul. 26, 2004.*the whole document*.
Excel Developer Tip (hereinafter "Excel"), "Determining the Data Type of a Cell", May 13, 1998, p. 1 (available at http://jwalk.com/ss//excel/tips/tip62.htm).
Macromedia, Inc.: "Dreamweaver Technote, Changes in copying and pasting in Dreamweaver 4" Internet Article (online). *The whole document*.
Rado, Dave: "How to create a template that makes it easy for users to "fill in the blanks", without doing any programming" Microsoft Word MVP FAQ Site, (online) Apr. 30, 2004, the whole document.
Microsoft Corporation, "Microsoft Computer Dictionary" Microsoft Press, Fifth Edition, p. 149.
"Webopedia Computer Dictionary", retrieved on May 9, 2006, at <<http://www.pewebopedia.com/TERM/O/OLE. html>>, Jupitermedia Corporation, 2006, 7 pages.
Cover, XML Forms Architecture, retrieved at <<http://xml.coverpages.org/xfa.html>> on Aug. 17, 2006, Coverpages, Jun. 16, 1999.
Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.
Pacheco, Xavier et al., "Delphi 5 Developers Guide", Sams Publishing. Chapter 31, Section: Data Streaming,(1999),4.
Beauchemin, Dave "Using InfoPath to Create Smart Forms", Retrieved from the Internet at http:/www.microsoft.com/office/infopath/prodinfo/using.mspx on Jan. 21, 2007,(Mar. 27, 2003).
Begun, Andrew et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).
Dubinko, Micah "XForms and Microsoft InfoPath", Retrieved from the Internet at http://www.xml.com/lpt/a/1311 on Jan. 21, 2007,(Oct. 29, 2003).
Udell, Jon "InfoPath and XForms", Retrieved from the Internet at http://weblog.infoworld.com/udell/2003/02/26.html,(Feb. 26, 2003).
Hoffman, Michael "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).
Singh, Darshan "Microsoft InfoPath 2003 by Example", Retrieved from the Internet at http://www.perfectxml.com/InfoPath.asp on Jan. 21, 2007,(Apr. 20, 2003).
Raman, T. V., et al., "XForms 1.0", (Dec. 2001),Section 1-12.2.3 & Appendices A-G.
"Enter Key", Retrieved from the Internet at http://systems.webopedia.com/TERM/Enter_key.html on Dec. 20, 2006.
Lehtonen, Miro et al., "A Dynamic User Interface for Document Assembly", Department of Computer Science, University of Helsinki,(Nov. 2002).
Rees, Michael J., "Evolving the Browser Towards a Standard User Interface Architecture", School of Information Technology, Bond University, Australia,(2001).
"Microsoft Visual Basic 5.0 Programmer's Guide", *Microsoft Press*, (1997),pp. 42-43, 54-58.
Nelson, Joe "Client-side Form Validation Using JavaScript", *Developer Advisory*, (Sep. 21, 2001).
Borland, Russo "Running Microsoft Word 97", 314-315, 338, 361-362, 390, and 714-719.
"Microsoft Word 2000", Screenshots,(1999),1-5.
Brabrand, et al., "Power Forms Declarative Client-side Form Field Validation", (2002),1-20.
Anat, Eyal et al., "Integrating and Customizing Hererogeneous E-Commerce Applications", The VLDB Journal—The International Journal on Very Large Data Bases, vol. 10, Issue 1,(Aug. 2001),16-38.

Adams, Susie et al., "BizTalk Unleashed", Sams publishing, 2002, first printing Mar. 2001,1-2, 31-138.
Vasters, Clemens F., "BizTalk Server 2000 A Beginners Guide", Osborne/McGraw-Hill,(2001),1-2, 359-402.
Halberg, Bruce et al., "Using Microsoft Excel 97", (1997),191-201, 213-219.
Villard, et al., "An Incremental XSLT Transformation Processor for XML Document Manipulation", http://www2002.org/CDROM/refereed/321, Printed on May 18, 2007,(May 2002),25 pages.
Hu, et al., "A Programmable Editor for Developing Structured Documents based on Bidirectional Transformations", ACM,(Aug. 2004),178-179.
Bradley, Neil "The XML Companion, Third Edition", *Published by Addison Wesley Professional*, http://proquest.safaribooksonline.com0201770598, http,(Dec. 12, 2001),1-18.
Klarlund, Nils "DSD: A Schema Language for XML", *ACM, FSMP Portland Oregon*, (2000),101-111.
Watt, Andrew "Microsoft Office Infopath 2003 Kick Starr", (*Published by Sams*) *Print ISBN-10:0-672-32623-X*, (Mar. 24, 2004),1-57.
Applicants' Statement Regarding a Non-Public Use.
Dodds, "Toward an XPath API", xml.com, (May 7, 2001), 1-3.
Altova, "Altova Tools for XPath 1.0/2.0", Altova, 1-12.
"Microsoft Word 2000 Screenshots", Word, (2000), 1-17.
Grosso, et al., "XML Fragment Interchange", W3C, (Feb. 2001), 1-28.
Altova, et al., "User and Reference Manual Version 4.4", www.xmlspy.com, (May 24, 2007), 1-565.
"XForm 1.0", W3C, (Jul. 16, 2001).
"Microsoft Word 2000 Screenshots", (2000), 11-17.
XMLSPY, "XmlSpy 2004 Enterprise Edition Manual", Altova, (May 17, 2004), 1-25, 220-225.
StylusStudio, "StylusStudio: XPath Tools", 2004-2007, StylusStudio, 1-14.
Baraband et al., PowerForms: "Declarative Client Site Form Field Validation", World Wide Web, Baltzer Science Publishers, Sussum, NL. vol. 3, No. 4, 1212000, p. 1-20.
Barker et al., "Creating In-Line Objects Within An Integrated Editing Environment," IBM Technical Disclosure Bulletin, vol. 27, No. 5, Oct. 1984, p. 2962.
Berg A., "Naming and Binding: Monikers" Inside OLE, 1995, Chapter 9, pp. 431-490.
Bray, et al., "Extensible Markup Language"; W3C Feb. 10, 1998, 37 pgs.
Clapp D., The NeXT Application Kit Part I: Non-Responsive Classes, The NeXT Bible 1990, Chapter 16, pp. 275-293.
Clark et al., W3C Editors; "XML Path Language (XPath) Version 1.0" Nov. 16, 1999, W3C (MIT INRIA Kejo), pp. 1-49.
"Copying the Search Form to Custom Pages in Windows Share Point Services-based Web Sites", CvBOOK Inc. Jul. 26, 2004 Internet Article, (2004), 1 page.
Description of Whitehill Composer software product producted by Whitehill Technologies Inc. available at <http://www.xml.com/pub/p/221> accessed on Apr. 8, 2004, 2 pages.
DiLascia et al., "Sweeper" Microsoft Interactive Developer, vol. 1, No. 1, 1996, 27 pages.
Dorward, Sean et al., "Unix Variants", Unix Review, vol. 10, No. 4, (Apr. 1992), pp. 29-31.
Hall, Richard S., "Agent-based Software Configuration and Development", http://www.doc.ic.ac.uk/-alw/edu/theses/hall-Qhd-0599.Qdf on Jun. 8, 2009, Thesis of the University of Colorado, (May 1, 1999), 182 pages.
Herzner et al., "CDAM—Compound Document Access and Management. An Object-Oriented Approach" Multimedia Systems Interaction and Applications, 1992, Chapter 3, pp. 17-36.
Honkala, Mikko et al., "Multimodal Interaction with XForms", ICWE '06, (2006), pp. 201-208.
"How to create a template that makes it easy for users to 'fill in the blank' withough doing any programming,", Retrieved from http ://word. mVQs.org/FAQs/Customization/FillinTheBlanks. htm, (Apr. 2004), pp. 1-2.
"HP Blade Server BH Series Operating System Guide", Hewlett Packard, 69 pgs. (Jul. 2002).

(56) References Cited

OTHER PUBLICATIONS

IBM: Stack Algorithm for Extracting Subtree from Serialized Tree, Mar. 1, 1994, TDB-ACC-NONN94033, 3 pages.
Kay, Michael "XSL Transformations (XSLT) Version 2.0", http://www.w3.orq/TR/2005/WD-xslt20-20050404 (04/205), 357 pgs.
Kobayashi et al., "An Update on BTRON-specification OS Development" IEEE 1991 pp. 132-140.
Peterson B., "Unix Variants," Unix Review, vol. 10, No. 4, Apr. 1992, pp. 29-31.
Pike et al., "Plan 9 from Bell Labs" UKUUG, Summer 1990, 10 pages.
Pike et al., "The Use of Name Spaces in Plan 9," Operating Systems Review vol. 27, No. 2, Apr. 1993, pp. 72-76.
Staneck W.; "Internal and External Media" Electronic Publishing Unleashed, 1995, Chapter 22, pp. 510-542.
"Store and Organize Related Project Files in a Binder," Getting Results with Microsoft Office, 1990, pp. 109-112.
Webopedia, "Definition of OLE", Retrieved from: <http://www.webopedia.com/TERM/O/OLE.html>, (May 16, 1998), 3 pages.
Webopedia, "Definition of OpenDoc", Retrieved from: <http://www.webopedia.com/TERM/O/OpenDoc.html>, (Sep. 18, 1997), 3 pages.
Webopedia, "Definition of Network", Retrieved from: <http://www.webopedia.com/TERM/n/network.html>, (Sep. 1, 1996), 2 pages.
Williams, et al.; "The Component Object Model A Technical Overview" Oct. 1994 Microsoft Corp. pp. 1-14.
"XML Forms Architecture (XFA)", Retrieved from http://xml.coverpages.org/xfa.html on Aug. 17, 2006, Cover Pages Technology Reports, (Jun. 16, 1999), p. 1.
Zdonik S.; "Object Management System Concepts," ACM, 1984, pp. 13-19.
Foreign Office Action dated Jan. 9, 2009 in Appln No. 200610003709.2, 8 pgs.
Foreign Office Action dated Feb. 9, 2009 in Appln No. 2,412,611, 6 pgs.
Foreign Office Action Final Notice of Rejection dated Jun. 5, 2009 in Appln No. 2002-503702, 16 pgs.
Foreign Office Action dated Jul. 10, 2009 in Appln No. 200610051554.X, 11 pgs.
Mexican Office Action dated Sep. 14, 2009 in Appln No. PA/a/2006/002493, 3 pgs.
Foreign Office Action dated Dec. 4, 2009 in Appln No. 200610051544.X, 9 pgs.
EP Office Action dated Feb. 25, 2010 in Appln No. 01939368.5, 3 pgs.
Russian Office Action dated Apr. 15, 2010 in Appln No. 2006105526 10 pgs.
Russian Office Action dated Apr. 20, 2010 in Appln No. 2006103267, 10 pgs.
Australian Office Action dated May 20, 2010 in Appln No. 2006200285, 2 pgs.
Chinese Fourth Office Action dated Jun. 25, 2010 in Appln No. 200610051554.X, 10 pgs.
U.S. Appl. No. 10/854,961, filed May 26, 2004 entitled "Form Template Data Source Change".
U.S. Appl. No. 10/857,689, filed May 27, 2004 entitled "Executing Applications at Appropriate Trust Levels".
U.S. Appl. No. 10/955,087, filed Jun. 24, 2004 entitled "Executing Applications at Appropriate Trust Levels".
U.S. Appl. No. 10/955,087, filed Sep. 20, 2004 entitled "Structured-Document Path-Language Expression Methods and Systems".
U.S. Appl. No. 10/955,665, filed Sep. 30, 2004 entitled "Systems and Methods for Handwriting to a Screen".
U.S. Appl. No. 10/955,666, filed Sep. 30, 2004 entitled "Workflow Interaction".
U.S. Appl. No. 10/976,461, filed Oct. 29, 2004 entitled "Systems and Methods for Interacting with a Computer Through Handwriting to a Screen".
U.S. Appl. No. 10/977,198, filed Oct. 29, 2004 entitled "Workflow Interaction".
U.S. Appl. No. 10/988,718, filed Nov. 15, 2004 entitled "Role-Dependent Action for an Electronic Form".
U.S. Appl. No. 10/988,732, filed Nov. 15, 2004 entitled "Building a Dynamic Action for an Electronic Form".
U.S. Appl. No. 11/012,472, filed Dec. 15, 2004 entitled "Recursive Sections in Electronic Forms".
U.S. Appl. No. 11/036,910, filed Jan. 14, 2005 entitled "Structural Editing Operations for Network Forms".
U.S. Appl. No. 13/915,364, filed Jun. 11, 2013 entitled "Systems and Methods for Interacting with a Computer Through Handwriting to a Screen".
U.S. Appl. No. 13/915,399, filed Jun. 11, 2013 entitled "Interacting with a Computer Through Handwriting to a Screen".
U.S. Official Action dated Nov. 15, 2006 in U.S. Appl. No. 10/854,961, 59 pgs.
U.S. Official Action dated Dec. 26, 2006 in U.S. Appl. No. 10/955,666, 59 pgs.
U.S. Official Action dated Jan. 25, 2007 in U.S. Appl. No. 10/988,718, 62 pgs.
U.S. Official Action dated Mar. 9, 2007 in U.S. Appl. No. 10/977,198, 51 pgs.
Response dated Mar. 27, 2007 in U.S. Appl. No. 10/854,961, 37 pgs.
U.S. Official Action dated Jun. 13, 2007 in U.S. Appl. No. 10/857,689, 71 pgs.
Response dated Jun. 21, 2007 in U.S. Appl. No. 10/955,666, 26 pgs.
Response dated Aug. 9, 2007 in U.S. Appl. No. 10/977,198, 11 pgs.
U.S. Official Action dated Aug. 30, 2007 in U.S. Appl. No. 10/955,666, 68 pgs.
U.S. Official Action dated Oct. 11, 2007 in U.S. Appl. No. 10/977,198, 21 pgs.
Response dated Oct. 31, 2007 in U.S. Appl. No. 10/977,198, 10 pgs.
Response dated Nov. 2, 2007 in U.S. Appl. No. 10/857,689, 9 pgs.
Response dated Nov. 13, 2007 in U.S. Appl. No. 10/955,666, 21 pgs.
U.S. Official Action dated Nov. 19, 2007 in U.S. Appl. No. 10/955,087, 84 pgs.
U.S. Official Action dated Jan. 10, 2008 in U.S. Appl. No. 10/977,198, 15 pgs.
U.S. Official Action dated Jan. 15, 2008 in U.S. Appl. No. 10/857,689, 22 pgs.
U.S. Official Action dated Feb. 4, 2008 in U.S. Appl. No. 10/955,666, 24 pgs.
Response dated Feb. 11, 2008 in U.S. Appl. No. 10/955,087, 14 pgs.
U.S. Official Action dated Mar. 20, 2008 in U.S. Appl. No. 10/976,451, 29 pgs.
U.S. Official Action dated Apr. 1, 2008 in U.S. Appl. No. 10/988,732, 86 pgs.
Response dated Apr. 15, 2008 in U.S. Appl. No. 10/857,689, 11 pgs.
U.S. Official Action dated May 12, 2008 in U.S. Appl. No. 10/876,433, 85 pgs.
U.S. Official Action dated May 16, 2008 in U.S. Appl. No. 10/955,087, 18 pgs.
Response dated May 30, 2008 in U.S. Appl. No. 10/977,198, 13 pgs.
Response dated Jul. 17, 2008 in U.S. Appl. No. 10/976,451, 5 pgs.
U.S. Official Action dated Jul. 18, 2008 in U.S. Appl. No. 10/857,689, 23 pgs.
Response dated Jul. 25, 2008 in U.S. Appl. No. 10/955,666, 23 pgs.
Response dated Jul. 29, 2008 in U.S. Appl. No. 10/876,433, 10 pgs.
U.S. Official Action dated Sep. 3, 2008 in U.S. Appl. No. 10/977,198, 19 pgs.
U.S. Official Action dated Sep. 11, 2008 in U.S. Appl. No. 10/955,665, 78 pgs.
Response dated Sep. 16, 2008 in U.S. Appl. No. 10/955,087, 21 pgs.
Response dated Sep. 30, 2008 in U.S. Appl. No. 10/988,732, 18 pgs.
U.S. Official Action dated Oct. 2, 2008 in U.S. Appl. No. 11/036,910, 71 pgs.
Response dated Oct. 10, 2008 in U.S. Appl. No. 10/857,689, 8 pgs.
U.S. Official Action dated Oct. 31, 2008 in U.S. Appl. No. 10/955,666, 33 pgs.
U.S. Official Action dated Nov. 14, 2008 in U.S. Appl. No. 10/876,433, 48 pgs.
U.S. Official Action dated Nov. 17, 2008 in U.S. Appl. No. 10/976,451, 15 pgs.
Response dated Nov. 21, 2008 in U.S. Appl. No. 10/977,198, 18 pgs.

(56) References Cited

OTHER PUBLICATIONS

U.S. Official Action dated Dec. 10, 2008 in U.S. Appl. No. 10/988,732, 30 pgs.
Notice of Allowance dated Dec. 11, 2008 in U.S. Appl. No. 10/955,087, 10 pgs.
U.S. Official Action dated Jan. 6, 2009 in U.S. Appl. No. 10/857,689, 23 pgs.
Response dated Jan. 12, 2009 in U.S. Appl. No. 10/955,665, 23 pgs.
Response dated Jan. 12, 2009 in U.S. Appl. No. 10/976,451, 5 pgs.
U.S. Official Action dated Jan. 21, 2009 in U.S. Appl. No. 11/170,521, 86 pgs.
U.S. Official Action dated Feb. 2, 2009 in U.S. Appl. No. 10/977,198, 15 pgs.
Response dated Feb. 11, 2009 in U.S. Appl. No. 10/876,433, 10 pgs.
U.S. Official Action dated Feb. 18, 2009 in U.S. Appl. No. 10/939,588, 40 pgs.
U.S. Official Action dated Feb. 23, 2009 in U.S. Appl. No. 10/976,451, 39 pgs.
U.S. Official Action dated Feb. 26, 2009 in U.S. Appl. No. 11/234,767, 109 pgs.
Response dated Mar. 2, 2009 in U.S. Appl. No. 10/955,666, 26 pgs.
Response dated Mar. 2, 2009 in U.S. Appl. No. 11/036,910, 14 pgs.
U.S. Official Action dated Mar. 6, 2009 in U.S. Appl. No. 10/942,528, 31 pgs.
U.S. Official Action dated Apr. 2, 2009 in U.S. Appl. No. 11/107,347, 15 pgs.
U.S. Official Action dated Apr. 2, 2009 in U.S. Appl. No. 10/955,665, 19 pgs.
U.S. Official Action dated Apr. 2, 2009 in U.S. Appl. No. 10/988,720, 19 pgs.
Response dated Apr. 2, 2009 in U.S. Appl. No. 10/857,689, 8 pgs.
Notice of Allowance dated Apr. 9, 2009 in U.S. Appl. No. 10/988,718, 17 pgs.
Response dated Apr. 10, 2009 in U.S. Appl. No. 10/988,732, 20 pgs.
U.S. Official Action dated Apr. 13, 2009 in U.S. Appl. No. 11/044,106, 20 pgs.
U.S. Official Action dated Apr. 14, 2009 in U.S. Appl. No. 11/203,818, 31 pgs.
U.S. Official Action dated Apr. 16, 2009 in U.S. Appl. No. 11/056,500, 12 pgs.
U.S. Official Action dated Apr. 20, 2009 in U.S. Appl. No. 11/226,044, 26 pgs.
U.S. Official Action dated Apr. 24, 2009 in U.S. Appl. No. 10/876,433, 27 pgs.
U.S. Official Action dated Apr. 30, 2009 in U.S. Appl. No. 10/916,692, 14 pgs.
U.S. Official Action dated May 7, 2009 in U.S. Appl. No. 11/203,937, 13 pgs.
U.S. Official Action dated May 7, 2009 in U.S. Appl. No. 10/955,666, 28 pgs.
U.S. Official Action dated May 13, 2009 in U.S. Appl. No. 09/599,809, 23 pgs.
Response dated May 26, 2009 in U.S. Appl. No. 10/976,451, 6 pgs.
U.S. Official Action dated May 27, 2009 in U.S. Appl. No. 11/295,178, 110 pgs.
U.S. Official Action dated May 28, 2009 in U.S. Appl. No. 10/990,152, 19 pgs.
U.S. Official Action dated Jun. 1, 2009 in U.S. Appl. No. 11/036,910, 15 pgs.
Response dated Jun. 2, 2009 in U.S. Appl. No. 10/977,198, 14 pgs.
U.S. Official Action dated Jun. 8, 2009 in U.S. Appl. No. 11/095,254, 13 pgs.
U.S. Official Action dated Jun. 10, 2009 in U.S. Appl. No. 11/234,767, 24 pgs.
U.S. Official Action dated Jun. 11, 2009 in U.S. Appl. No. 10/857,689, 25 pgs.
U.S. Official Action dated Jun. 11, 2009 in U.S. Appl. No. 10/988,732, 31 pgs.
U.S. Official Action dated Jul. 2, 2009 in U.S. Appl. No. 10/976,451, 19 pgs.
Response dated Jul. 2, 2009 in U.S. Appl. No. 10/955,665, 10 pgs.
Response dated Jul. 6, 2009 in U.S. Appl. No. 10/876,433, 11 pgs.
Response dated Jul. 22, 2009 in U.S. Appl. No. 10/955,666, 32 pgs.
U.S. Official Action dated Aug. 3, 2009 in U.S. Appl. No. 11/227,550, 19 pgs.
U.S. Official Action dated Aug. 12, 2009 in U.S. Appl. No. 11/234,767, 26 pgs.
U.S. Official Action dated Aug. 19, 2009 in U.S. Appl. No. 10/977,198, 22 pgs.
Response dated Aug. 19, 2009 in U.S. Appl. No. 10/857,689, 9 pgs.
Response dated Aug. 26, 2009 in U.S. Appl. No. 10/976,451, 7 pgs.
U.S. Official Action dated Aug. 27, 2009 in U.S. Appl. No. 10/939,588, 35 pgs.
Response dated Jul. 21, 2010 in U.S. Appl. No. 11/036,910, 28 pgs.
U.S. Official Action dated Jul. 27, 2010 in U.S. Appl. No. 10/976,451, 15 pgs.
U.S. Official Action dated Aug. 19, 2010 in U.S. Appl. No. 11/036,910, 11 pgs.
Response dated Aug. 26, 2010 in U.S. Appl. No. 10/988,732, 31 pgs.
Response dated Sep. 14, 2010 in U.S. Appl. No. 11/036,910, 26 pgs.
Response dated Oct. 25, 2010 in U.S. Appl. No. 10/976,451, 7 pgs.
U.S. Official Action dated Nov. 10, 2010 in U.S. Appl. No. 10/976,451, 14 pgs.
U.S. Official Action dated Nov. 12, 2010 in U.S. Appl. No. 10/988,732, 39 pgs.
Notice of Allowance dated Nov. 24, 2010 in U.S. Appl. No. 11/012,472, 6 pgs.
Response dated Feb. 16, 2011 in U.S. Appl. No. 10/976,451, 7 pgs.
U.S. Official Action dated Apr. 6, 2011 in U.S. Appl. No. 10/976,451, 10 pgs.
Response dated Jun. 13, 2011 in U.S. Appl. No. 10/976,451, 7 pgs.
U.S. Official Action dated Jul. 23, 2012 in U.S. Appl. No. 10/976,451, 38 pgs.
Response dated Nov. 19, 2012 in U.S. Appl. No. 10/976,451, 10 pgs.
Notice of Allowance dated Feb. 4, 2013 in U.S. Appl. No. 10/976,451, 10 pgs.
U.S. Official Action dated Sep. 17, 2013 in U.S. Appl. No. 13/915,364, 85 pgs.
Response dated Dec. 17, 2013 in U.S. Appl. No. 13/915,364, 10 pgs.
U.S. Official Action dated Jan. 28, 2014 in U.S. Appl. No. 13/915,364, 24 pgs.
U.S. Official Action dated Aug. 28, 2009 in U.S. Appl. No. 10/402,640, 28 pgs.
Response dated Sep. 3, 2009 in U.S. Appl. No. 10/988,732, 18 pgs.
U.S. Official Action dated Sep. 8, 2009 in U.S. Appl. No. 11/170,521, 20 pgs.
U.S. Official Action dated Sep. 8, 2009 in U.S. Appl. No. 11/567,149, 32 pgs.
U.S. Official Action dated Sep. 17, 2009 in U.S. Appl. No. 10/942,528, 36 pgs.
U.S. Official Action dated Sep. 17, 2009 in U.S. Appl. No. 11/107,347, 15 pgs.
U.S. Official Action dated Sep. 24, 2009 in U.S. Appl. No. 11/044,106, 23 pgs.
Response dated Oct. 1, 2009 in U.S. Appl. No. 11/036,910, 18 pgs.
U.S. Official Action dated Oct. 6, 2009 in U.S. Appl. No. 11/012,472, 81 pgs.
U.S. Official Action dated Oct. 14, 2009 in U.S. Appl. No. 10/955,666, 31 pgs.
U.S. Official Action dated Oct. 20, 2009 in U.S. Appl. No. 11/557,931, 95 pgs.
U.S. Official Action dated Oct. 29, 2009 in U.S. Appl. No. 10/976,451, 15 pgs.
Notice of Allowance dated Nov. 3, 2009 in U.S. Appl. No. 10/955,665, 8 pgs.
Notice of Allowance dated Nov. 10, 2009 in U.S. Appl. No. 10/876,433, 13 pgs.
U.S. Official Action dated Nov. 13, 2009 in U.S. Appl. No. 10/988,732, 33 pgs.
U.S. Official Action dated Nov. 13, 2009 in U.S. Appl. No. 11/036,910, 15 pgs.
U.S. Official Action dated Nov. 16, 2009 in U.S. Appl. No. 10/916,692, 15 pgs.

(56) References Cited

OTHER PUBLICATIONS

U.S. Official Action dated Nov. 16, 2009 in U.S. Appl. No. 11/218,149, 27 pgs.
U.S. Official Action dated Nov. 16, 2009 in U.S. Appl. No. 11/072,087, 18 pgs.
Response dated Dec. 16, 2009 in U.S. Appl. No. 10/976,451, 7 pgs.
U.S. Official Action dated Dec. 17, 2009 in U.S. Appl. No. 11/170,521, 18 pgs.
U.S. Official Action dated Dec. 17, 2009 in U.S. Appl. No. 10/857,689, 26 pgs.
U.S. Official Action dated Dec. 24, 2009 in U.S. Appl. No. 11/295,178, 46 pgs.
U.S. Official Action dated Dec. 30, 2009 in U.S. Appl. No. 10/402,640, 21 pgs.
U.S. Official Action dated Dec. 31, 2009 in U.S. Appl. No. 12/021,894, 43 pgs.
Response dated Jan. 4, 2010 in U.S. Appl. No. 11/012,472, 14 pgs.
U.S. Official Action dated Jan. 14, 2010 in U.S. Appl. No. 11/218,149, 18 pgs.
U.S. Official Action dated Jan. 19, 2010 in U.S. Appl. No. 11/227,550, 18 pgs.
U.S. Official Action dated Jan. 26, 2010 in U.S. Appl. No. 11/234,767, 28 pgs.
Response dated Feb. 1, 2010 in U.S. Appl. No. 11/036,910, 11 pgs.
Response dated Feb. 5, 2010 in U.S. Appl. No. 10/857,689, 9 pgs.
U.S. Official Action dated Mar. 10, 2010 in U.S. Appl. No. 11/227,550, 32 pgs.
U.S. Official Action dated Mar. 22, 2010 in U.S. Appl. No. 11/107,347, 16 pgs.
U.S. Official Action dated Mar. 23, 2010 in U.S. Appl. No. 11/012,472, 11 pgs.
U.S. Official Action dated Apr. 5, 2010 in U.S. Appl. No. 10/916,692, 27 pgs.
U.S. Official Action dated Apr. 9, 2010 in U.S. Appl. No. 10/976,451, 30 pgs.
Response dated Apr. 13, 2010 in U.S. Appl. No. 10/988,732, 15 pgs.
U.S. Official Action dated Apr. 30, 2010 in U.S. Appl. No. 10/402,640, 25 pgs.
Response dated May 5, 2010 in U.S. Appl. No. 10/976,451, 7 pgs.
Notice of Allowance dated May 14, 2010 in U.S. Appl. No. 10/857,689, 35 pgs.
U.S. Official Action dated May 18, 2010 in U.S. Appl. No. 11/567,140, 9 pgs.
U.S. Official Action dated May 19, 2010 in U.S. Appl. No. 11/218,149, 37 pgs.
U.S. Official Action dated May 26, 2010 in U.S. Appl. No. 10/988,732, 49 pgs.
U.S. Official Action dated May 26, 2010 in U.S. Appl. No. 11/295,178, 58 pgs.
U.S. Official Action dated May 26, 2010 in U.S. Appl. No. 11/036,910, 15 pgs.
Response dated Jun. 3, 2010 in U.S. Appl. No. 11/012,472, 9 pgs.
U.S. Official Action dated Jun. 29, 2010 in U.S. 11/170,521, 36 pgs.
U.S. Official Action dated Jul. 1, 2010 in U.S. Appl. No. 11/012,472, 9 pgs.
U.S. Official Action dated Jul. 9, 2010 in U.S. Appl. No. 11/107,347, 36 pgs.
Notice of Allowance dated Jul. 21, 2010 in U.S. Appl. No. 10/857,689, 9 pgs.
Response dated Mar. 27, 2014 in U.S. Appl. No. 13/915,364, 12 pgs.

* cited by examiner

404

706
708

SALES REPORT

702 — QUALITY OF SERVICE?
SATISFIED

704 — CUSTOMER | SALE DATE | DELIVERY DATE
ACME TIRE CO. | 3/13/2000 | 4/7/2000

710 — PRODUCT — SNOW CHAINS

712 — NUMBER OF PRODUCT — 43

714 — PRICE — 13.50

716 — PRODUCT TOTAL — 580.50

718 — PRODUCT — MAG WHEELS

720 — NUMBER OF PRODUCT — 8

722 — PRICE — 82.38

724 — PRODUCT TOTAL — 659.04

726 — PRODUCT — TRUCK BED LINER

728 — NUMBER OF PRODUCT — 1

730 — PRICE — 102.96

732 — PRODUCT TOTAL — 102.96

Fig. 7

| NAME (412) | AUTHOR (414) | CUSTOMER (602) | TOTAL SALE (604) | SALE DATE (606) | QUALITY OF SERVICE? (608) |
|---|---|---|---|---|---|
| 1st Sales Report | Joe Smith | VICTORY Tire Co. | $1,342.50 | 13-Mar-00 | Satisfied |
| 2nd Sales Report | Bud Acker | Jim's Auto Supply | $2,549.00 | 16-Jun-99 | Satisfied |
| 3rd Sales Report | Ned Jones | VICTORY Tire Co. | $843.12 | 18-Apr-01 | Delivery Late |

SALES REPORT

QUALITY OF SERVICE?
SATISFIED

704 →

| CUSTOMER | SALE DATE | DELIVERY DATE |
|---|---|---|
| VICTORY TIRE CO. | 3/13/2000 | 4/7/2000 |

| | |
|---|---|
| PRODUCT | SNOW CHAINS |
| NUMBER OF PRODUCT | 43 |
| PRICE | 13.50 |
| PRODUCT TOTAL | 580.50 |
| PRODUCT | MAG WHEELS |
| NUMBER OF PRODUCT | 8 |
| PRICE | 82.38 |
| PRODUCT TOTAL | 659.04 |
| PRODUCT | TRUCK BED LINER |
| NUMBER OF PRODUCT | 1 |
| PRICE | 102.96 |
| PRODUCT TOTAL | 102.96 |

Fig. 10

PROMOTING DATA FROM STRUCTURED DATA FILES

TECHNICAL FIELD

This invention relates to promoting data from structured data files.

BACKGROUND

Computer users, whether they be businesses or individuals, often need to share access to data files. For this reason, data files are often stored at some location accessible by many different users, such as a computer server. Users can then access the data files on the server through a communications network.

Typically, a computer server allows access to a database that stores many, many data files. This database can be arranged into a filing system, usually listing the data files by file name. Finding data files by name can be fairly easy, but finding data files having particular characteristics can be difficult, because the names of the data files may not sufficiently inform users about characteristics of the data files.

To address this need to find data files having certain characteristics, some current servers include libraries that describe the data files accessible by the server in greater detail than simply the data files' names. These servers can also include a web server to enable users to see and access the libraries. For example, some current computer servers include Microsoft SharePoint™ Products and Technologies, which provide a library and web server that describes data files accessible by the computer server.

FIG. 1 shows a simplified model of a typical server and library. FIG. 1 shows a server 102 that includes a database 104 with data files 106, a filing system 108, and a library 110, as well as a web server 112.

The library 110 typically contains basic information about the data files 106. When a computer user 114 accesses the library 110 through a communication network 116, the server 102 (through the web server 112) presents the information in the library 110 as a table. Often this information (also called "properties") can be easily seen and/or searched by the user 114.

Referring to FIG. 2, a table 202 is shown that includes properties of the data files 106. Three data files, a first, second, and third data file 204, 206, and 208, are shown in a part 210 of the filing system 108. The table 202 shows an example of four properties of these three data files.

Each row of the table 202 is dedicated to each of the data files 204, 206, and 208. Each of these rows can contain a reference and/or be uniquely identified with the data file to which it is dedicated. Each column of the table 202 is dedicated to a property of these data files. Each row and column can intersect at a cell; this cell can provide information unique to a particular property for a particular data file. The first column shows a property for each of the data file's names, called a name property 212. The second column provides an author's name property 214 about each of the data files. The third column provides a creation-date property 216. The fourth provides a last-modified-date property 218. These properties inform the user 114 about each of the three data files' name, author, creation date, and last date it was modified.

Other information can also be added to the library 110. This information can be added, usually at the computer user's 114 request. This information is typically information entered into the library 110 by the computer user 114. Thus, the user 114 can request that the library 110 add an additional column and then manually enter information into that column.

Typical libraries are inadequate in many ways, however. The properties included in current libraries often fail to inform the user 114 about what data is actually in the data files 106. Rather, these properties typically provide the user 114 with information exterior to the data files 106, such as when they were created or who authored them.

SUMMARY

In accordance with at least one embodiment, a data promotion tool is provided and enables promotion of data from a structured data file to a library. In at least some embodiments, the described tool also enables demotion of data from a library to a structured data file.

BRIEF DESCRIPTION OF THE DRAWINGS

FIG. 7 illustrates a rendering of an exemplary structured data file, in accordance with one embodiment, having fields with data.

FIG. 9 sets forth an exemplary table, in accordance with one embodiment, having basic and advanced properties, one of the advanced properties for two of three structured data files containing new, demotable data.

FIG. 10 illustrates a rendering of an exemplary structured data file, in accordance with one embodiment, having fields with data, one of the fields containing new, demoted data.

The same numbers are used throughout the disclosure and figures to reference like components and features.

DETAILED DESCRIPTION

Examples of Promoting Data

Figure 1:
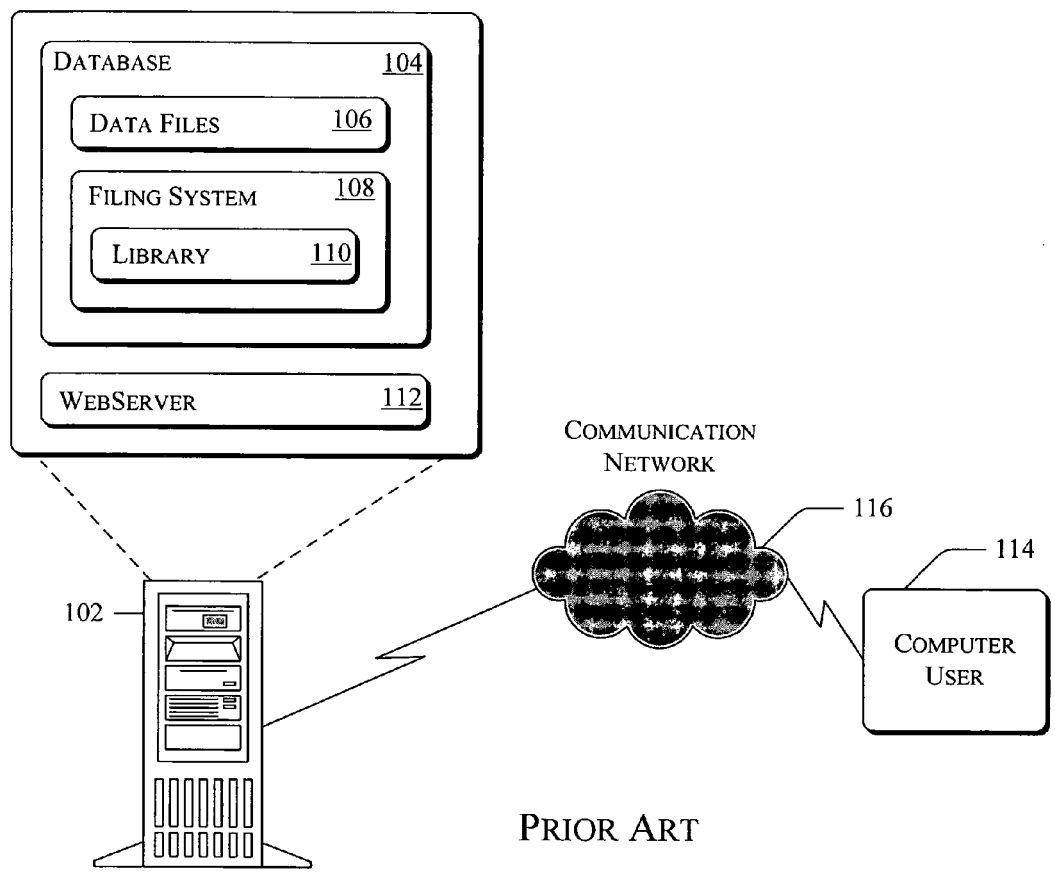
FIG. 1 illustrates a simplified model of a typical server having a database with data files, a filing system, and a library within the filing system, and a web server; communications network; and a computer user.
Figure 2:
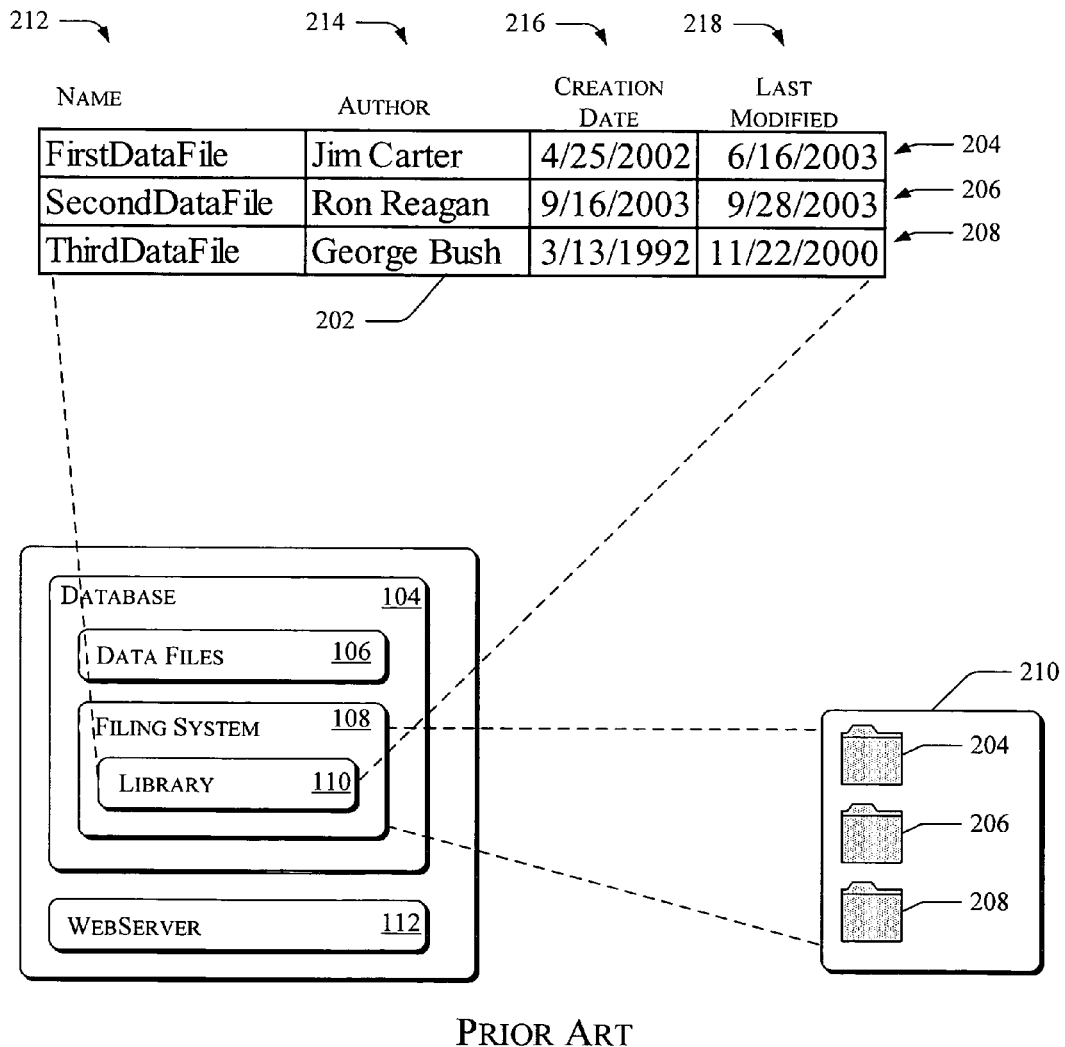
FIG. 2 illustrates applications and files of a simplified, typical server and sets forth an exemplary table of a library showing basic properties of three data files.

The following disclosure describes a system and method (a "tool") for promoting data from structured data files. This promotion can enable a library to allow users to quickly and easily search through properties that are based on data that is within the structured data files.

If, for instance, a sales manager wants to see every sales report that lists a sale to "ACME Tire Co.", he can do so. He can search the library with a search engine and almost immediately see every sales report that mentions a sale to ACME Tire Co.

This promotion of data from within a structured data file is very powerful. The data promoted can be easily searched or presented to users for easy viewing. The data promoted can also be a function of data copied from within the structured data file. These functions can aggregate data from within a structured data file, for instance.

If the sales manager wants to see every sales report that lists a sale to ACME Tire Co. where the sales total to ACME Tire Co. is greater than $1000, for instance, he can do so. Assume that the sales reports are structured data files and that each can have multiple entries for sales. Data from each of the entries in each of the sales reports can be copied, added together, and the total promoted to the library. Thus, the library can contain the total sales to ACME Tire Co. for each of the sales reports. The manager, then, can search the library for sales to ACME Tire Co. that total more than $1000. Quickly and easily, the manager can find every sales report that has sales to ACME Tire Co. totaling greater than $1000.

In this example, the sales manager did all of this without altering the sales reports or having people enter information into the library by hand.

Example of Demoting Data

The tool described in the following disclosure can also demote data from a file (e.g., a library) to within a structured, data file. Demotion allows a user to quickly and easily change data within structured data files.

Like the first example above, assume the sales manager found every sales report that lists a sale to ACME Tire Co., regardless of the total of the sales. In this case, assume that the sales manager wants to change all of the sales reports. He could open each of the files listed in the library and alter each, but that could be time consuming and possibly mistake prone (especially if he has to enter something many times).

Instead, the tool described here allows him to alter each of the sales reports through another file (e.g., a library). With this tool, the sales manager can replace a promoted property in a library with some other data and have a corresponding change made to the sales reports. This is a type of demotion.

Continuing the example, assume that 132 sales reports are found when the sales manager searches for sales reports with sales to ACME Tire Co. Assume also that the sales manager has learned that ACME Tire Co. just changed its name to "VICTORY Tire Co.". To keep his new sales reports to VICTORY Tire Co. and his old sales reports to ACME Tire Co. consistent, he wants to change the name of "ACME Tire. Co." to "VICTORY Tire Co." in each of the sales reports. With the disclosed tool, he can do so.

The sales manager, with the 132 sales reports listed from his library search, can globally change the words "ACME Tire Co." to "VICTORY Tire Co." The tool can then change the part (e.g., the node) within each of the 132 sales reports that lists "ACME Tire Co." to "VICTORY Tire Co.". The sales manager is enabled to do all of this simply and easily, without having to change each sales report manually.

As is apparent, demotion of data from a library to within a structured data file is powerful; it can save time, money, and be more accurate than many alternatives.

Promoting Data, Generally

As mentioned in part above, the tool promotes data from within structured data files. The data can be promoted to various types of files, including those that are easy for a user to search, such as data storage that can be optimized for search functions. The file into which data is promoted can be a text file, a database, and the like. The file can be a locally accessible library, such as one stored on a computer user's computer or accessible via a local intranet. The file can also be remotely accessible, such as a library stored on a server accessible via the global internet.

In the following description a currently available library is altered and augmented for use as the file into which data from structured data files is promoted. The use of this library in the description below is not intended to limit the scope or applicability of the tool; other types of files that allow for searching and/or presentation of data can also be used. Also as part of this implementation, structured data files from which data is promoted are not altered, either in their structure or their contents. In other implementations, the structured data files can be altered as part of promotion of data, though altering the structured data files may cause undesirable complications for later use of the structured data files.

Also in the following description, the tool is described in the context of a server having the currently available library, a database with structured data files, and a web server; a communications network; and a single computer user. These devices will be described first, followed by a discussion of the techniques in which these and other devices can be used.

Exemplary Architecture

Figure 3:
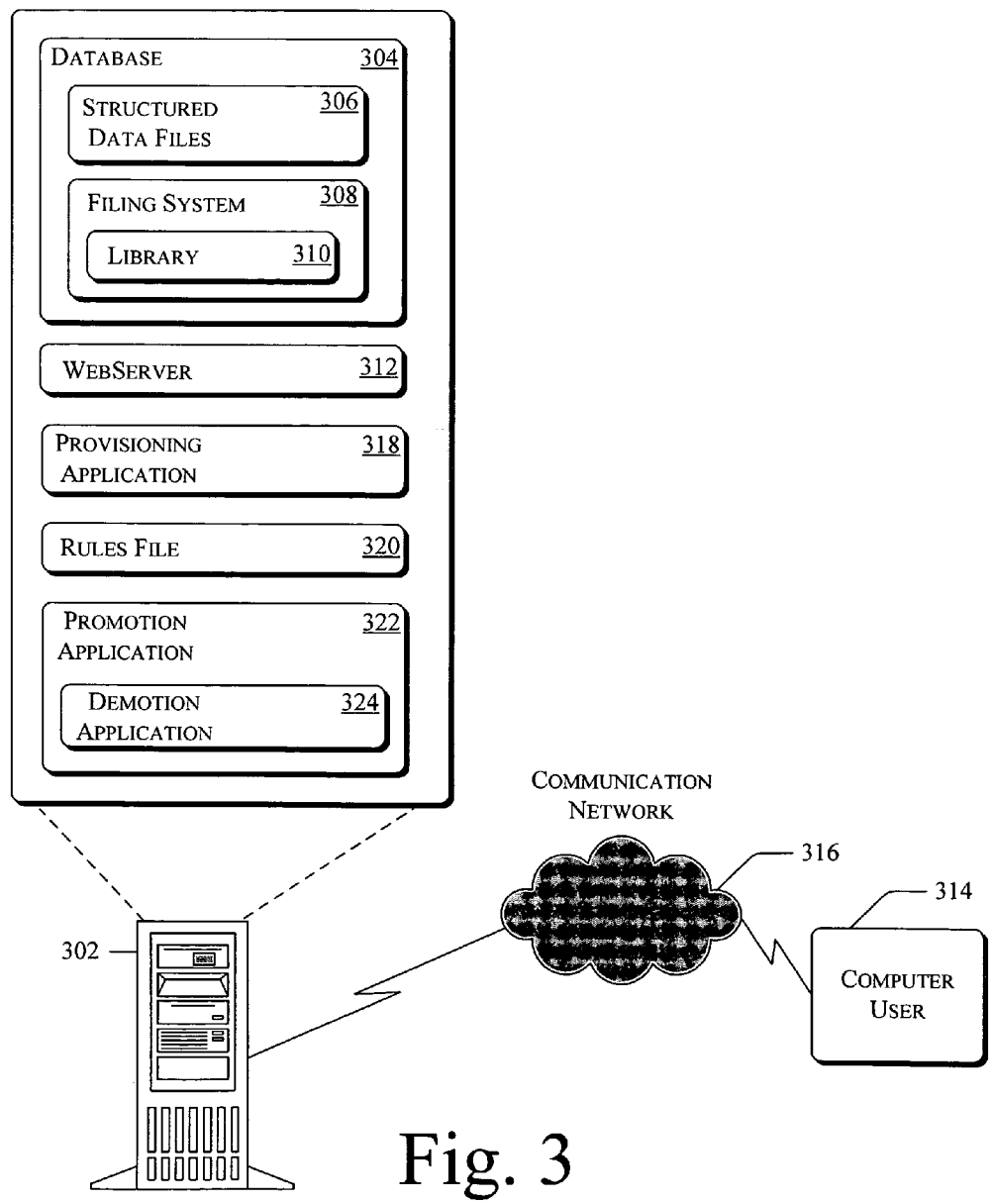
FIG. 3 illustrates an exemplary computer server, in accordance with one embodiment, capable of promoting and demoting data from and to structured data files, an exemplary communication network, and an exemplary computer user.
Figure 4:
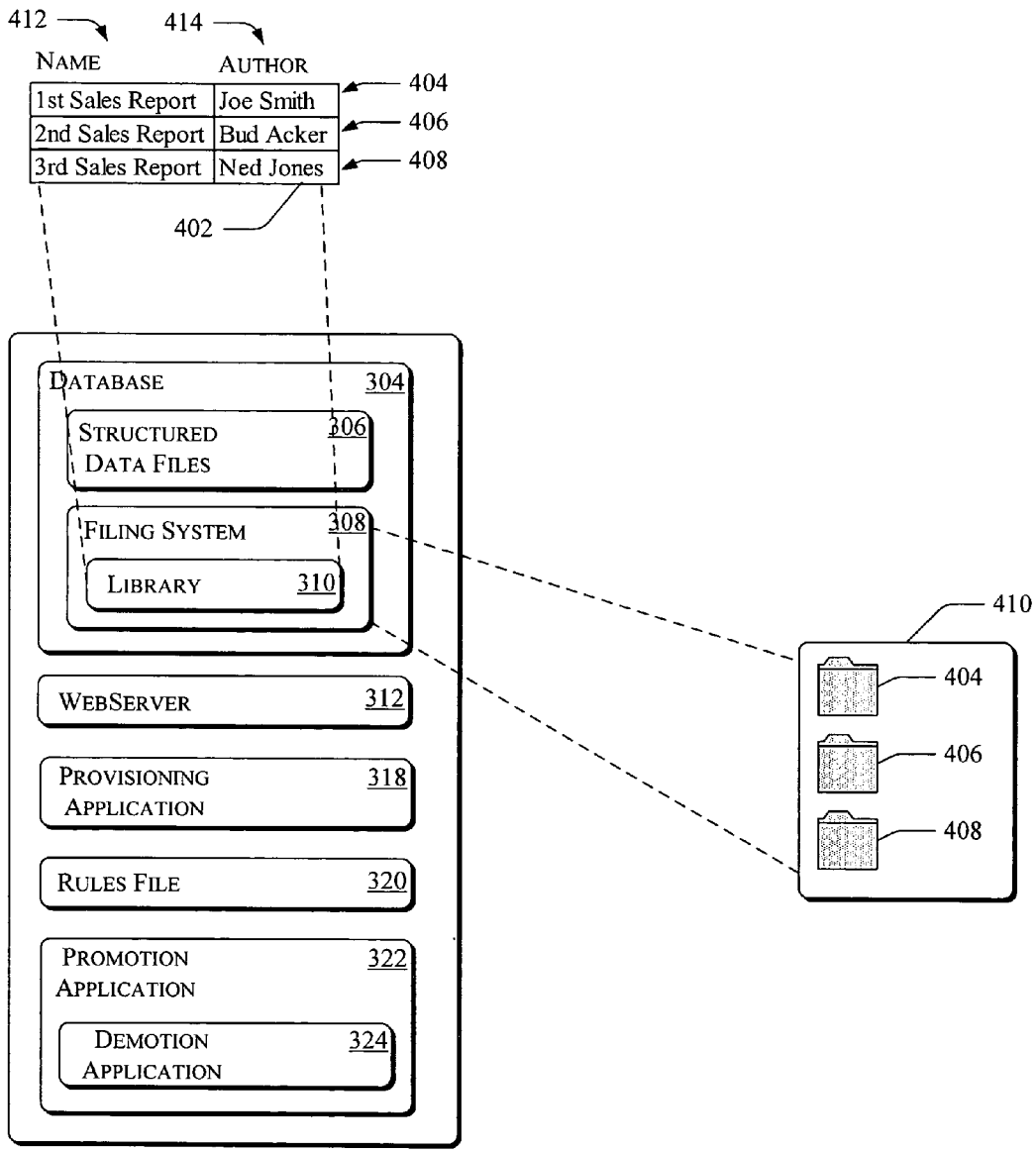
FIG. 4 illustrates exemplary applications and files of an exemplary computer server, in accordance with one embodiment, capable of promoting and demoting data, and sets forth an exemplary table showing basic properties of three data files.

FIGS. 3 and 4 include an exemplary architecture for the promotion and demotion tool, in accordance with one embodiment. The architecture in these figures is intended to aid in the discussion of the tool, and is not intended to limit its applicability.

FIG. 3 shows a simplified model of a server 302; a database 304 having structured data files 306, a filing system 308, and a library 310 within the filing system 308; a web server 312; a computer user 314; and a communication network 316. The server 302 can be accessed by the user 314 through the communication network 316. The communication network 316 can be a local intranet or a global internet, for example.

The server 302 also includes a provisioning application 318, a rules file 320, and a promotion application 322. The promotion application 322 can include a demotion application 324, discussed in greater detail below.

In this implementation, the library 310 contains two basic properties about three of the structured data files 306, discussed below. When the computer user 314 accesses the library 310, the server 302 presents these basic properties in the library 310 as a table.

FIG. 4 sets forth a table 402 showing two basic properties of three of the structured data files 306. The data files 306 include a first sales report 404, a second sales report 406, and a third sales report 408. These reports are shown in a part 410 of the filing system 308 for the database 304. The basic properties shown are a file-name property 412 and an author-name property 414.

Techniques for Provisioning, Promoting, and Demoting Data

Preparing the Library for New Properties

Prior to promoting data from within the structured data files 306 into the library 310, the provisioning application 318 communicates with the library 310 to prepare the library 310 for new properties.

The provisioning application 318 can be part of the server 302 or otherwise. In the example shown in FIG. 3, the provisioning application 318 is part of the server 302.

Figure 5:
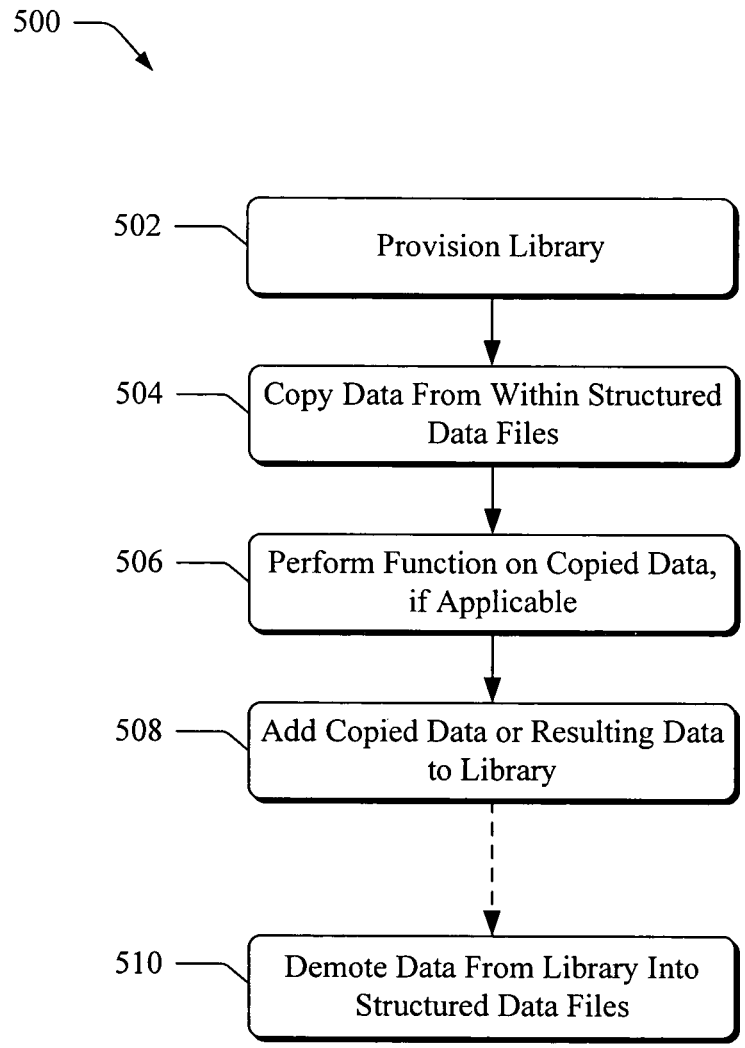
FIG. 5 sets forth a flow diagram of an exemplary process, in accordance with one embodiment, for provisioning, promoting, and demoting data of structured data files.

FIG. 5 shows an exemplary process 500 for provisioning, promoting, and demoting data, in accordance with one embodiment. The process 500 is illustrated as a series of blocks representing individual operations or acts performed by the server 302. This and other processes described herein may be implemented in any suitable hardware, software, firmware, or combination thereof. In the case of software and firmware, these processes represent sets of operations implemented as computer-executable instructions.

At block 502, the provisioning application 318 prepares ("provisions") for new properties to be promoted. This can include creating a new library or altering an existing one. In the ongoing implementation, the library 310 is altered to be capable of adding new properties. In doing so, the provisioning application 318 alters or requests that the library 310 alter itself. In FIG. 4, the library 310 shows properties for files as columns, with a row dedicated to each of the structured data files 306. Thus, in this example the provisioning application 318 interacts with the library 310 to add a column for each property that is to be added.

Figure 6:
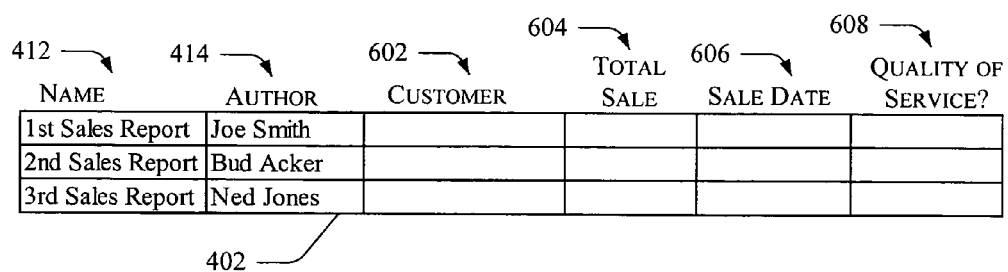
FIG. 6 sets forth an exemplary, provisioned table, in accordance with one embodiment, for showing basic and advanced properties of three structured data files.

FIG. 6 sets forth an exemplary provisioned example of the table 402 showing two basic properties of three of the structured data files 306 (the structured data files 404, 406, and 408) and new columns for four advanced properties. The basic properties shown are the file-name property 412 and the author-name property 414. The advanced properties shown are a customer-name advanced property 602, a total-sale advanced property 604, a sale-date advanced property 606, and a quality-of-service advanced property 608. The columns for these advanced properties are provisioned but do not yet have data promoted into them. These particular advanced properties are examples of many different kinds of properties that can be provisioned and promoted as part of this process 500.

As part of this block 502 the provisioning application 318 can follow various instructions in the rules file 320. The rules file 320 includes instructions on what data is to be promoted, where it is to be promoted (such as in which column of the library 310), how to provision (e.g., alter) the library 310 to make room for the new properties, and the like. The rules file 320 can include functions that are to be performed on data copied (e.g., extracted) from the structured data files 306 and ways to locate the data within the structured data files 306.

In one implementation, the rules file 320 is constructed with the aid of various XML schemas (e.g., as specified by XSD) governing structured data files that include XML.

Promoting Data from Structured Data Files

The promotion application 322 promotes data within a structured data file. It can do so following blocks 504 and 508 or blocks 504, 506, and 508.

Specifically, at block 504, the promotion application 322 copies data from a structured data file. To do so, the promotion application 322 locates a particular part (e.g., node) of the structured data file and then copies the data in that part. The promotion application 322 can do so on command from a user or entity, such as from or through the server 302 or the library 310. The promotion application 322 can also do so when a structured data file is being saved into the database 304.

At this block 504 the promotion application 322 can follow various instructions in the rules file 320. The rules file 320, for instance, can instruct the promotion application 322 to locate a part of a structured data file with an XPath (XML Path language) expression, if the structured data file includes XML. With that part located, the promotion application 322 can copy whatever is in the located part, such as "ACME Tire Co." for instance.

FIG. 7 sets forth an exemplary structured data file having fields with data. This exemplary structured data file is an example of a rendering of the first sales report 404 authored by Joe Smith (see FIG. 4). The first sales report 404 can also be represented hierarchically, thereby showing parts of the structured data file as nodes (not shown).

The first sales report 404 shown in FIG. 7 includes the following fields containing data: quality field 702; customer field 704; sale date field 706; delivery date field 708; first product field 710; first product quantity field 712; first product price field 714; first product price total field 716; second product field 718; second product quantity field 720; second product price field 722; second product price total field 724; third product field 726; third product quantity field 728; third product price field 730; and third product price total field 732.

At block 504 the promotion application 322 copies data from particular parts of the first sales report 404 (here represented as fields in the rendered first sales report 404). In this implementation, the data to be copied is shown within the following fields: the quality field 702; the customer field 704; the sale date field 706; the first product price total field 716; the second product price total field 724; and the third product price total field 732.

At block 506, the promotion application 322 performs functions, if applicable, on the copied data. The functions can include aggregating the data, summing the data (if the data is numerical), comparing data to other information available to the promotion application 322, concatenating the data, and other functions known in the art.

In the ongoing example, the data copied at block 504 from the first sales report 404 includes: "satisfied", shown in the quality field 702; "ACME Tire Co.", shown in the customer field 704; "Mar. 13, 2000", shown in the sale date field 706; "580.50", shown in the first product price total field 716; "659.04", shown in the second product price total field 724; and "102.96", shown in the third product price total field 732.

Based on the instructions in the rules file 320, the promotion application 322 can perform functions on the data. In the ongoing example, the rules file 320 instructs the promotion application 322 to add up the first, second, and third product price totals. Thus, the promotion application 322 adds "580.50", "659.04", and "102.96" for a total of "1342.50."

At block 508, the promotion application 322 adds the copied and/or resulting data to the library 310. If a function has been performed on the data copied, the data resulting from the function on the copied data is added to an appropriate part of the library 310. If not, the copied data is added.

In the ongoing example, the rules file 320 instructs the promotion application 322 to add the data, "satisfied", "ACME Tire Co.", "Mar. 13, 2000", and 1342.50 to the advanced properties shown in the table 402 shown in FIG. 6. Thus, the promotion application 322 adds this data to the columns for the customer-name advanced property 602, the total-sale advanced property 604, the sale-date advanced property 606, and the quality-of-service advanced property 608 for the first row. The first row corresponds to the first sales report 404.

The promotion application 322 also performs blocks 504, 506, and 508 for the second and third sales reports 406 and 408 and so fills the other rows of the table 402.

Figure 8:
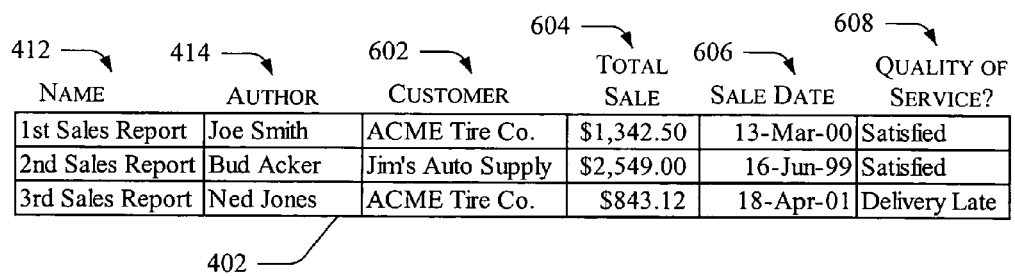
FIG. 8 sets forth an exemplary table, in accordance with one embodiment, having basic and advanced properties for three structured data files.

FIG. 8 sets forth an exemplary promoted example of the table 402 showing two basic properties of three of the structured data files 306 (the structured data files 404, 406, and 408) and columns containing four advanced properties. The basic properties shown are the file-name property 412 and the author-name property 414. The advanced and now populated properties shown are the customer-name advanced property 602, the total-sale advanced property 604, the sale-date advanced property 606, and the quality-of-service advanced property 608. These particular advanced properties are examples of many different kinds of properties that can be provisioned and promoted as part of this process 500.

As shown in FIG. 8, with the disclosed tool a user can quickly and easily see and/or search through structured data files based on what is in those files. The user can view and search certain data promoted to the library 310, allowing the user to better analyze and sort through structured data files.

Demoting Data into Structured Data Files

At block 510, in accordance with the same embodiment, the demotion application 324 can optionally demote data into a structured data file. To do so, the demotion application 324 locates a particular part (or parts) of the structured data file that are associated with data in the library 310. The demotion application 324 can determine this association based on the data's location in the library 310, such as a cell in the table 402. The demotion application 324 then replaces the data in the appropriate part of the structured data file with data from that location in the library 310. The demotion application 324 can do so on command from a user or entity, such as from or through the server 302 or the library 310. The demotion application 324 can also demote data in the library 310 into the structured data file whenever a user replaces data within the library 310 with other data.

In one implementation, a user can change data in multiple structured data files by globally changing data in an advanced property in the library 310. If, for example, the sales manager from the above examples wishes to change the customer's name in the first sales report 404 and the third sales report 408, he can do so simply by changing the customer name in the customer-name advanced property 602 (filled and shown in FIG. 8).

Assume that the sales manager uses the library 310 and the customer-name advanced property 602 of FIG. 8 to find two structured data files in which the customer is "ACME Tire Co." In this example only two such structured data files are shown to have this customer name (the first sales report 404 and the third sales report 408) though hundreds of structured data files could also be demoted in the same way. The sales manager can find these by running a search of the library 310 to present only those structured data files in which the word "ACME" appears in the properties 602 of FIG. 8. The sales manager could also just globally replace the names without running a search.

In this example, the sales manager wants to change all of the sales reports from the name "ACME Tire Co." to "VICTORY Tire Co." In this implementation he can do so simply by globally replacing the text in the library 310 "ACME Tire Co." with "VICTORY Tire Co."

FIG. 9 sets forth an exemplary and altered, promoted table 902 showing two basic properties of the structured data files 306 (the sales reports 404, 406, and 408) and columns containing the four advanced properties, 602, 604, 606, and 608. The basic properties shown are the file-name property 412 and the author-name property 414. The advanced, populated properties shown are the customer-name advanced property 602, the total-sale advanced property 604, the sale-date advanced property 606, and the quality-of-service advanced property 608. Here the data in two of the customer-name advanced property's 602 fields have been altered to replace "ACME Tire Co." with "VICTORY Tire Co."

In this example, the demotion application 324 alters each of the sales reports 404 and 408. The demotion application 324 demotes the replaced data into the sales reports 404 and 408. With this tool, the sales manager can replace a promoted property in the library with some other information and have a corresponding change made to the sales reports.

FIG. 10 sets forth an example of this demotion, here to the sales report 404 rendered in FIG. 7. Here the customer name is changed from "ACME Tire Co." with "VICTORY Tire Co.", as shown at a demoted example of the customer field 704.

Using this tool disclosed herein, a user can alter many, many structured data files quickly and easily.

Exemplary Implementation

The following implementation describes one way in which the tool can be implemented. The server 302 and its parts, the communication network 316, and the computer user 314 will be used to aid in describing this implementation, as will the structured data files 404, 406, and 408. In this implementation, the communication network 316 includes a global interne and the server 302 is an altered version of the currently available SharePoint™ server. The library 310 is an altered version of a library used by the SharePoint™ server.

These are used as examples of this implementation, and are not intended to limit the scope or applicability of this implementation or the tool.

Figure 11:
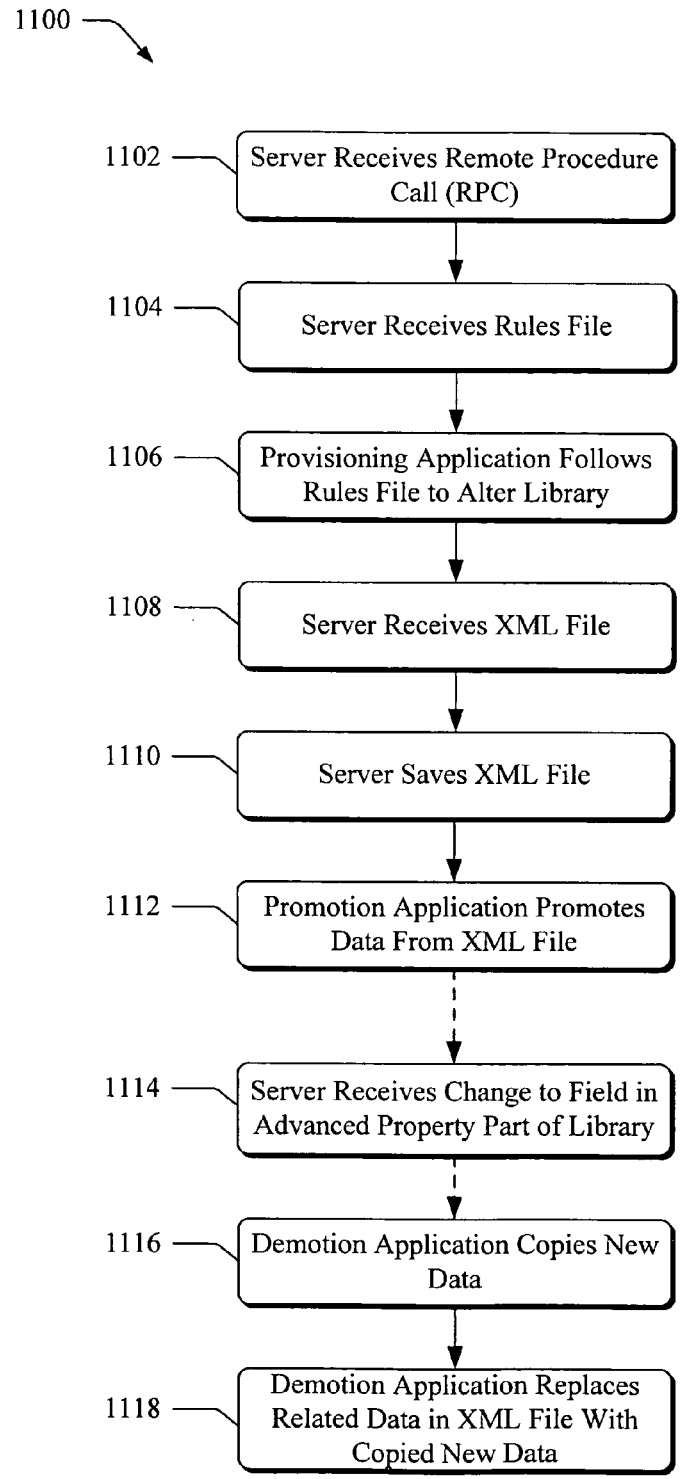
FIG. 11 sets forth a flow diagram of an implementation of an exemplary process, in accordance with one embodiment, for provisioning, promoting, and demoting data of structured data files.

FIG. 11 shows an exemplary process 1100, which is an implementation of the process 500 for provisioning and promoting data from the structured data files 306.

At block 1102, the server 302 receives a remote procedure call (RPC) across the communication network 316. This RPC uses the URL (Universal Resource Locator) to identify the server 302. It also includes instructions to the library 310, which the library 310 follows. This RPC call is used by the library 310 to add basic properties fields, if desired, and to set up the library 310. The RPC is communicated through HTTP (HyperText Transfer Protocol), though it can be done in other well-known ways as well.

At block 1104, the server 302 receives the rules file 320. In one implementation, the server 302 receives the rules file 320 in another RPC sent by the computer user 314. As shown in FIG. 3, the rules file 320 is then stored by the server 302.

At block 1106, the provisioning application 318 reads the rules file 320 to instruct the library to add advanced property fields to the library 310. An example of these advanced property fields that can be opened by the library 310 in response to the provisioning application 318 following the rules file 320 are the advanced properties 602, 604, 606, and 608 shown in FIG. 6.

The server 302 can receive a second or additional rules file to augment or replace the rules file 320. Thus, if the computer user 314 wants to change the library 310 again, the user 314 can send another rules file to replace or augment the rules file 320.

At block 1108, the server 302 receives an XML file. The server 302 can receive the XML file via an RPC from the computer user 314. In this implementation, the structured data files include XML. Also in this implementation, the XML file is transported in a Simple Object Access Protocol (SOAP) wrapper. It is later loaded in Document Object Model (DOM) format for promotion and/or demotion of data.

A simplified view of DOM for the sales report 404 can be shown as:

---

FirstSalesReport

---

Quality
Customer
SaleDate
DeliveryDate

-continued

```
FirstSalesReport
Product
    ProductQuantity
    ProductPrice
    ProductPriceTotal
Product
    ProductQuantity
    ProductPrice
    ProductPriceTotal
Product
    ProductQuantity
    ProductPrice
    ProductPriceTotal
```

Here the root of the structured data file is "FirstSalesReport".

At block 1110, the server 302 saves the XML file. The server 302 receives the XML file and saves it into the structured data files 306 of the database 304. The XML file is sent in SOAP because that can make it easier to transfer. It can be loaded in DOM format because that can make it easier to process and search. As part of parallel to, or after this save of the XML file, the promotion application 322 acts. The library 310 also acts to promote basic properties into the library 310.

At block 1112, the promotion application 322 follows the instructions in the rules file 320 to promote data (as advanced properties) from within the XML file into the library 310. The library 310 also promotes basic properties about the XML file (such as the properties 412 and 414 of FIG. 4). Block 1112 is an exemplary implementation of blocks 504 and 508 or 504, 506, and 508 of the process 500.

As part of block 1112, the promotion application 322 reads and follows instructions in the rules file 320. The rules file's 320 instructions include rules. The promotion application 322 reads and follows each rule of the rules file 320 in order, until all of the rules have been followed and advanced promotion is complete.

For example, assume that the XML file saved at block 1110 is the sales report 404. Assume also that the rules file 320 includes the following rules:

Rule 1: Select FirstSalesReport/"Customer," copy data here, store data here into third column of row associated with XML file's row.

Rule 2: Select FirstSalesReport/Product/"ProductPriceTotal," copy data here, perform function (add together) all copied data that is in any node with this name, store the result in fourth column associated with XML file's row.

Rule 3: Select FirstSalesReport/"SaleDate," copy data here, store data here into fifth column of row associated with XML file's row.

Rule 4: Select FirstSalesReport/"Quality," copy data here, store data here into sixth column of row associated with XML file's row.

Starting with Rule 1, the promotion application 322 finds any nodes of the XML file indicated by the FirstSalesReport/ "Customer" with an XPath expression (which is included in the rules file 320). In this case there is only one node with this name, so the promotion application 322 copies data within the node, here "ACME Tire Co." and copies it into the correct column (for the sales report 404 it is the first row of the third column of the table 402 show in FIG. 6). The promotion application 322 uses an OLEDB (Object Linking and Embedding to DataBase) mapping to store the data in the correct column and row of the table 402. The result is shown in this field of promoted table 402 of FIG. 8.

If the promotion application 322 finds multiple nodes with the XPath given and no function is to be performed on the data copied from the nodes, the promotion application 322 copies the data from the first node and adds it into the table 402.

For Rule 2, the promotion application 322 finds any nodes of the XML file indicated by the FirstSalesReport/Product/ "ProductPriceTotal" with an)(Path expression. In this case there are three nodes with this name, so the promotion application 322 copies data from all three of the nodes. The data in the nodes is: 580.50; 659.04; and 102.96 (shown in FIG. 7 at references 716, 724, and 732). The promotion application 322 follows the function in the Rule 2 (here to add the data from each of the nodes). The promotion application 322 adds the data together for a total of 1,342.50. The promotion application 322 then copies the result of the function, here 1,342.50 into the correct column (for the sales report 404 it is the first row of the fourth column of the table 402 shown in FIG. 6). Again the promoting application 322 uses an OLEDB mapping. The result is shown in this field of promoted table 402 of FIG. 8.

For Rule 3, similar to Rule 1, the promotion application 322 finds any nodes of the XML file indicated by the FirstSalesReport/"SaleDate" with an) (Path expression. There is only one node with this name, so the promotion application 322 copies data within the node, here "Mar. 13, 2000", and copies it into the correct column. Again, see the promoted table 402 of FIG. 8.

For Rule 4, similar to Rules 1 and 3, the promotion application 322 finds any nodes of the XML file indicated by the FirstSalesReportl"Quality" with an) (Path expression. There is only one node with this name, so the promotion application 322 copies data within the node, here "Satisfied", and copies it into the correct column. Again, see the promoted table 402 of FIG. 8.

Demoting

If desired, the demoting application 324, which can be part the promoting application 322 (such as a sub-application), can demote data from the library 310 into the XML file.

In this implementation, if the user makes any change to a field in the advanced properties of the library 310, the web server 312 will prompt the user to determine if the user wants the change demoted to the XML file. If so, the demotion application 324 can make this demotion.

At block 1114, the server 302 receives a change to a field in the advanced properties. Before continuing, the server 302 receives instructions (such as from the user 314 after a prompt from the demotion application 324) to demote the new data.

At block 1116, the demotion application 324 copies the new data from the change made to the field in the advanced properties.

From one of the above examples, assume that the sales manager changes the first row of the customer-name advanced property 602 from "ACME Tire Co." to "VICTORY Tire Co." (shown in FIGS. 8 and 9). Then, at block 1116, the demotion application 324 copies "VICTORY Tire Co." The demotion application 324 can then communicate with the promotion application 322 to determine which node of which file is related to the change (such as with: FirstSalesReport/ "Customer"). This may be with an)(Path expression, as above, when the structured data file comprises XML.

At block 1118, the demotion application 324 finds the correct node(s) of the correct file (here relating to the customer-name field 704 of the first sales report 404 of FIG. 7) with an XPath expression. The demotion application 324 then replaces the data within that node or nodes with the new data. This is shown in the demoted example of the customer-name field 704 shown in FIG. 10.

CONCLUSION

The above-described tool enables a user to promote data from within a structured data file. It can also enable a user to demote data from a library or other file into a structured data file. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. One or more computer storage memories storing instructions which, when executed by a computer processor, are configured to perform acts of data promoting from structured data files comprising:
   accessing a rules file comprising one or more rules for provisioning a library and promoting data into the library;
   provisioning the library according to the rules file to create a new property based on data within one or more individual nodes of a structured data file, wherein the provisioning comprises adding at least one column corresponding to the new property in a table in the library;
   receiving the structured data file comprising Extensible Markup Language (XML);
   for multiple nodes of the structured data file, at least a portion of which are identically named, copying data located within that node of the structured data file associated with the new property without altering structure and content of the structured data file;
   aggregating the copied data with other copied data associated with other nodes of the structured data file associated with the new property to produce a result;
   after aggregating the copied data with the other copied data, promoting the result into the at least one column added to the table corresponding to the new property associated with the structured data file in the library according to the rules file, the rules file providing instructions for promoting the result with an XML Path language (XPath) expression; and
   storing the promoted result in the library and associating the promoted result with the structured data file, wherein the storing and associating are effective to allow searching and presentation of the promoted result in the at least one column added to the table.

2. The memories of claim 1, wherein the act of copying is performed without altering a schema governing the structured data file.

3. The memories of claim 1, wherein the one or more rules within the rules file are based on a schema governing the structured data file.

4. The memories of claim 1, wherein the act of copying comprises locating a particular identically named node of the structured data file and copying the data in the located identically named node.

5. The memories of claim 1, wherein the act of storing the promoted result comprises storing the promoted result at an assigned location in the library.

6. The memories of claim 1, wherein the act of storing the promoted result comprises storing the promoted result within a cell of the table in the library.

7. The memories of claim 6, wherein the table comprises rows for multiple structured data files and columns for properties associated with the multiple structured data files.

8. The memories of claim 1, further comprising searching the library for the promoted result.

9. The memories of claim 1, wherein the library is a database.

10. The memories of claim 1, wherein the library is accessible by a server of a communication network.

11. The memories of claim 1, wherein the provisioning the library comprises:
   creating the library with a location to accept the promoted result.

12. The memories of claim 1, further comprising:
   receiving new data replacing the promoted result in the library; and
   altering the structured data file to reflect the new data.

13. The memories of claim 12, wherein the act of altering the structured data file comprises locating a node of the structured data file from which the promoted result in the library was copied and replacing the copied data in the node with the new data.

14. One or more computer storage memories storing instructions which, when executed by a computer processor, are configured to perform acts of data promoting from structured data files comprising:
   provisioning a library according to a set of rules to create a new property based on data within one or more individual fields of a structured data file, wherein the set of rules provides instructions for the provisioning the library with an Extensible Markup Language Path language (XPath) expression, wherein the provisioning comprises adding at least one column corresponding to the new property in a table in the library;
   receiving the structured data file comprising Extensible Markup Language (XML);
   for multiple nodes of the structured data file at least a portion of which are identically named, copying data located within an individual field of the node associated with the new property without altering structure and content the structured data file, wherein the copied data comprises content contained within the individual field of the node of the structured data file;
   aggregating the copied data with other copied data associated with other individual fields of other identically named nodes of the structured data file associated with the new property;
   after aggregating the copied data with other copied data, promoting a result of the aggregating into the at least one column added to the table corresponding to the new property associated with the structured data file in the library according to the set of rules; and
   storing the promoted result in the at least one column added to the table in the library and associating the promoted result with the structured data file, wherein the storing and associating are effective to allow searching and presentation of the promoted result.

15. The memories of claim 14, wherein the act of copying data from multiple nodes comprises copying data from multiple, identically named nodes of the structured data file.

16. The memories of claim 15, wherein the act of aggregating comprises concatenating the copied data from the multiple, identically named nodes.

17. One or more computer storage memories storing instructions which, when executed by a computer processor, are configured to perform acts of data promoting from structured data files comprising:
   receiving a set of rules describing actions for provisioning a library and promoting data into the library, wherein the library describes properties of data located within one or more individual nodes of a structured data file;
   following the set of rules to provision the library to create a new property, wherein the provisioning comprises adding at least one column corresponding to the new property in a table in the library;

receiving the structured data file comprising Extensible Markup Language (XML);

for multiple nodes of the structured data file at least a portion of which are identically named, copying data from the node associated with the new property without altering the structured data file;

aggregating the copied data located within two or more multiple identically named nodes;

after aggregating the copied data, promoting the aggregated data into the at least one column added to the table corresponding to the new property in the library according to the set of rules, wherein the promoting uses an XML Path language (XPath) expression; and storing the promoted data in the library and associating the promoted data with the structured data file.

18. The memories of claim 17, wherein the act of receiving the set of rules comprises receiving the set of rules across a communication network and the act of receiving the structured data file comprises receiving the structured data file across the communication network.

19. The memories of claim 17, wherein the act of receiving the structured data file comprises receiving the structured data file in a document object model form.

20. The memories of claim 17, wherein the act of promoting the data comprises locating multiple identically named nodes of the structured data file with the XPath expression, copying the data within a first of the multiple nodes, and storing the copied data in the library.

21. The memories of claim 17, wherein the act of promoting the data comprises determining a location in the library to place the aggregated data with aid from an OLEDB (Object Linking and Embedding to DataBase) expression.

22. The memories of claim 17, wherein the act of promoting the data further comprises:
performing a function using the copied data; and
copying a result of the function into the library.

23. The memories of claim 17, further comprising:
presenting the promoted data in a table of the library.

24. The memories of claim 17, further comprising:
receiving a change to the promoted data in the library; and
demoting the changed data into the structured data file.

25. The memories of claim 24, wherein the act of demoting comprises determining to which node or nodes of the structured data file the promoted data is associated and updating the node or nodes to reflect the changed data.

26. The memories of claim 17, wherein the set of rules is a first set of rules and the acts further comprise:
receiving at least a second set of rules, and wherein the act of following the set of rules to provision the library comprises following the second set of rules and the act of promoting the data comprises following the second set of rules.

27. The memories of claim 17, wherein the set of rules comprises a rules file.

28. An apparatus for data promoting from structured data files comprising:

a computer processor; and computer memory coupled with the computer processor containing a series of instructions that, when executed by the computer processor, cause the computer processor to:

access a rules file comprising one or more rules for provisioning a library and promoting data into the library, wherein the library describes a property associated with a node of a structured data file;

provision the library according to the rules file to create a new property based on data within the node of the structured data file, wherein the provisioning comprises adding at least one column corresponding to the new property in a table in the library;

receive the structured data file comprising Extensible Markup Language (XML);

for each of multiple, identically named nodes of the structured data file, locate the node of the structured data file;

copy data located within the node of the structured data file associated with the new property in the located node without altering structure and content of the structured data file, wherein the copied data comprises at least some of the content contained within the structured data file;

aggregate the copied data with other copied data associated with other identically named nodes of the structured data file associated with the new property to produce a result; and after aggregating the copied data with the other copied data, promote the result into the at least one column added to the table corresponding to the new property associated with the structured data file in the library according to the rules file, wherein the rules file provides instructions for promoting the result with an XML Path language (XPath) expression.

29. The apparatus of claim 28, the structured data file is not altered when the node is located.

30. The apparatus of claim 28, wherein one or more the rules are based on a schema governing the structured data file.

31. The apparatus of claim 28, wherein locating comprises locating multiple nodes of the structured data file, and copying comprises copying data from the multiple nodes of the structured data file.

32. The apparatus of claim 28, wherein the provisioning the library further comprises:
creating a location in the library to accept the aggregated copied data.

33. The apparatus of claim 28, further causing the computer processor to:
receive new data replacing the promoted result in the library; and
alter the structured data file to include the new data.

* * * * *